(12) United States Patent
Hiramoto et al.

(10) Patent No.: US 6,745,540 B2
(45) Date of Patent: Jun. 8, 2004

(54) SPOUT SEALING METHOD AND SEALING APPARATUS

(75) Inventors: Shinichi Hiramoto, Iwakuni (JP); Keizo Hirata, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 0 days.

(21) Appl. No.: 09/882,544

(22) Filed: Jun. 15, 2001

(65) Prior Publication Data

US 2002/0157348 A1 Oct. 31, 2002

(30) Foreign Application Priority Data

Jun. 15, 2000 (JP) ........................................ 2000-180633

(51) Int. Cl.$^7$ ............................. B65B 61/14; B65B 61/18
(52) U.S. Cl. ..................... 53/133.2; 53/133.1; 53/284.7; 53/287; 53/300; 53/308; 53/313
(58) Field of Search .......................... 53/133.1, 133.2, 53/284, 284.7, 287, 300, 308, 313, 410; 198/470.1, 471.1, 803.3, 803.7; 493/213, 927, 929

(56) References Cited

U.S. PATENT DOCUMENTS

| | | | | |
|---|---|---|---|---|
| 3,862,486 A | * | 1/1975 | McArdle | 29/413 |
| 3,975,888 A | * | 8/1976 | Jones | 53/386.1 |
| 4,297,929 A | * | 11/1981 | Schieser et al. | 83/110 |
| 4,506,489 A | * | 3/1985 | Schieser et al. | 53/64 |
| 4,507,168 A | | 3/1985 | Konaka | |
| 5,219,320 A | * | 6/1993 | Abrams et al. | 493/8 |
| 5,413,157 A | * | 5/1995 | McGregor | 141/314 |
| 5,429,699 A | * | 7/1995 | Abrams et al. | 156/252 |
| 5,435,803 A | * | 7/1995 | Owen et al. | 493/87 |
| 5,581,975 A | * | 12/1996 | Trebbi et al. | 53/284.6 |
| 5,857,309 A | * | 1/1999 | Cicha et al. | 53/167 |
| 5,943,840 A | * | 8/1999 | Nilsson et al. | 53/133.2 |
| 6,045,493 A | * | 4/2000 | Totani | 493/201 |
| 6,085,489 A | * | 7/2000 | Bachner et al. | 53/410 |
| 6,119,440 A | * | 9/2000 | Benner, Jr. et al. | 53/473 |
| 6,148,874 A | * | 11/2000 | Rutter et al. | 141/10 |
| 6,321,813 B1 | * | 11/2001 | Miyajima et al. | 156/497 |

FOREIGN PATENT DOCUMENTS

| | | | |
|---|---|---|---|
| EP | 1167010 | * 2/2002 | B31B/1/84 |
| JP | H10-202768 | 8/1998 | |
| JP | 10-202768 | 8/1998 | |
| JP | H11-077860 | 3/1999 | |
| JP | 11-077860 | 3/1999 | |
| JP | H11-333950 | 12/1999 | |
| JP | 11-333950 | 12/1999 | |

* cited by examiner

Primary Examiner—Rinaldi I. Rada
Assistant Examiner—Gloria R Weeks
(74) Attorney, Agent, or Firm—Koda & Androlia

(57) ABSTRACT

A spout sealing method and apparatus using a spout insertion and temporary-sealing apparatus, a primary sealing apparatus, a secondary sealing apparatus and a cold-sealing apparatus that are installed in a row; and transfer apparatuses being installed between these sealing apparatuses. Each apparatus has a continuously rotating rotor. A plurality of spout holding members which hold and convey spouts are disposed at equal intervals on the circumferences of the rotors, and spouts are continuously transferred between the spout holding members of adjacent rotors. In the spout insertion and temporary-sealing apparatus, bags and spouts are supplied from different sources; and the bags are fitted over the spouts held by the spout holding members, and the bags and spouts are temporarily sealed by a temporary-sealing apparatus. Then, main sealing is performed by the primary sealing apparatus and secondary sealing apparatus, and the main sealing area is cooled by the cold-sealing apparatus.

17 Claims, 17 Drawing Sheets

FIG. 17B
FIG. 17A
FIG. 17C
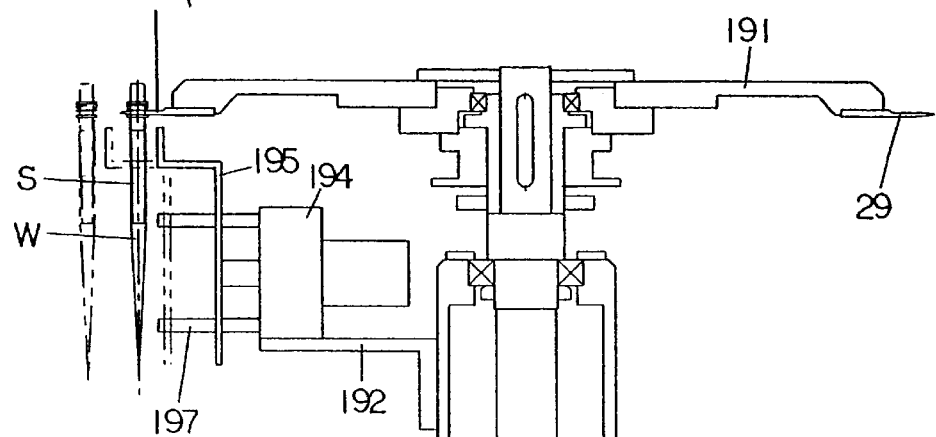
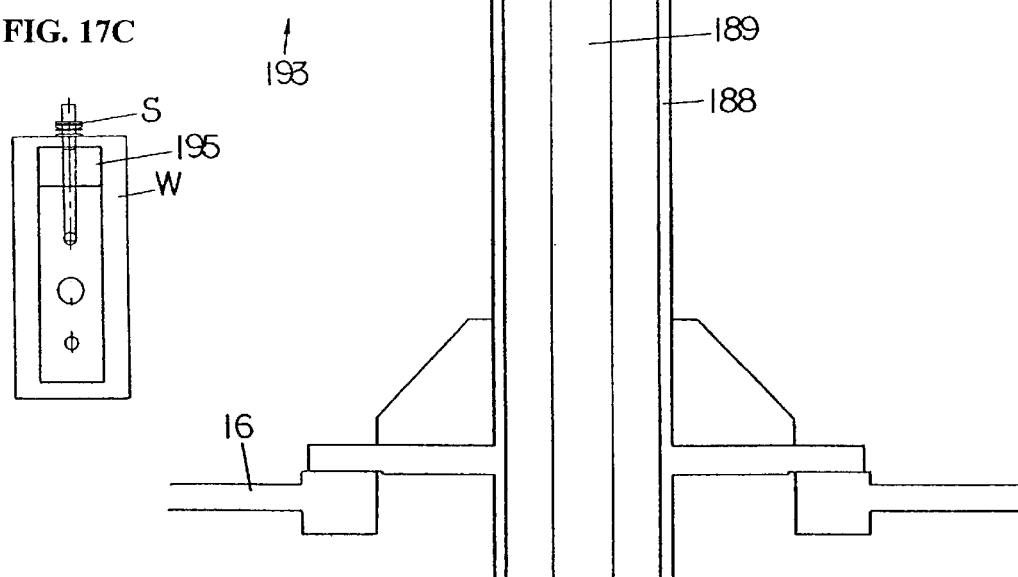

SPOUT SEALING METHOD AND SEALING APPARATUS

BACKGROUND OF THE INVENTION

1. Field of the Invention

The present invention relates to a spout sealing apparatus which manufactures spout-equipped bags by inserting spouts into bags, temporarily sealing the sealing portions of the spouts in the mouths of the bags, and then performing a main sealing operation on the bags which have spouts attached thereto.

2. Prior Art

Japanese Patent Application Laid-Open (Kokai) No. H11-333950, for instance, discloses a spout sealing apparatus that manufactures spout-equipped bags by inserting spouts into bags and then sealing the sealing portions of the spouts in the mouths of the bags. In this apparatus, spouts are held in an inverted state by a plurality of spout holding members disposed on the circumference of a main disk, and bags are fitted over the held spouts from above while the main disk is stopped during the intermittent rotation of the main disk. In addition, the sealing portions of the spouts and the mouths of the bags are successively sealed by first through sixth heating means disposed around the main disk.

In Japanese Patent Application Laid-Open (Kokai) No. H11-77860, a plurality of pouch holding bodies are disposed on the circumference of a continuously rotating rotary apparatus. After spouts are inserted into bags, the spouts are held along with the individual bags by the pouch holding bodies; a first sealing apparatus, second sealing apparatus and cold-sealing apparatus which are disposed around the rotary apparatus are rotated with a movement that follows the continuous rotation of the rotary apparatus for a specified distance; and sealing and cold-sealing are performed during this rotation. After thus performing a following-rotation for a specified distance, the respective sealing apparatuses rotate in the reverse direction and return to their original positions, with such following-rotation and return rotation being repeated.

Furthermore, Japanese Patent Application Laid-Open (Kokai) No. H10-202768 discloses a continuously rotating rotary apparatus. In this apparatus, a plurality of spout holding means are disposed on the circumference of an upper rotating table; opener devices which fit bags over the spouts, heater means and cooler means are disposed on a lower rotating table so as to correspond to the respective spout holding means. Bags are fitted over the spouts; and the bags are sealed and cold-sealed, while both rotating tables are continuously rotated.

However, the apparatus described in Japanese Patent Application Laid-Open (Kokai) No. H11-333950 uses a system in which the main disk that holds the spouts rotates intermittently. As a result, this apparatus suffers from the problem of an extremely slow processing rate in terms of bags per minute.

In the apparatus described in Japanese Patent Application Laid-Open (Kokai) No. H11-77860, the rotary apparatus uses a continuous rotation system. However, the sealing apparatuses use a following-rotation system, and it is necessary that the first and second sealing and cold-sealing all be performed while the rotary apparatus performs approximately one half rotation. Accordingly, it is difficult to increase the rotational speed of the rotary apparatus, and the processing rate is slow.

In the apparatus disclosed in Japanese Patent Application Laid-Open (Kokai) No. 10-202768, the rotary apparatus uses a continuous rotation system, but sealing (e~ffff) and cold-sealing (f~g) must be respectively completed during ¼ rotation. Accordingly, it is difficult to increase the rotational speed of the rotary apparatus, and the processing rate is slow.

SUMMARY OF THE INVENTION

The present invention solves the above-described problems.

The object of the present invention is to increase the processing rate and improve productivity in the manufacture of spout-equipped bags using a rotary apparatus.

The above object is accomplished by a unique method of the present invention wherein:

a spout insertion and temporary-sealing apparatus and a spout main-sealing apparatus are disposed so that the spout main-sealing apparatus is positioned on a downstream side of a spout insertion and temporary-sealing apparatus, the spout insertion and temporary-sealing apparatus holding spouts by means of a plurality of spout holding members that are disposed on a circumference of a continuously rotating rotor, fitting bags over the spouts while rotationally conveying the spouts, and then temporarily sealing the bags and spouts, and the spout main-sealing apparatus holding the spouts of temporarily sealed bags, that have attached spouts, by means of a plurality of spout holding members disposed on a circumference of a continuously rotating rotor, the spout main-sealing apparatus further performing a main sealing operation while rotationally conveying the temporarily sealed bags with attached spouts, and wherein bags with attached spouts that have been temporarily sealed by the spout insertion and temporary-sealing apparatus are continuously transferred to the spout main-sealing apparatus and subjected to main sealing.

By thus performing the process up to and including temporary sealing and the process of main sealing, using separate rotors, it is possible to shorten the operating time per rotor, so that the rotational speed of the rotors can be increased. The above temporary sealing process becomes necessary as a result of the fact that the main-sealing process is performed by means of a rotor which is separate from the rotor that performs the insertion process, etc.

The above-described main-sealing process can be split into a primary sealing process and secondary sealing process. In other words, the main-sealing apparatus can be constructed from a primary sealing apparatus and a secondary sealing apparatus that is installed on the downstream side of the primary sealing apparatus. By dividing the main-sealing process, which requires the most operating time, into two processes, it is possible to increase the rotational speed of the rotors even further.

Furthermore, it is desirable that a cold-sealing apparatus be disposed on the downstream side of the main-sealing apparatus so that bags with attached spouts that have been subjected to main-sealing by the main-sealing apparatus are continuously transferred to the cold-sealing apparatus and cold-sealed. This cold-sealing apparatus holds the spouts of bags by means of a plurality of spout holding members that are disposed on the circumference of a continuously rotating rotor, and performs cold-sealing while rotationally conveying the bags.

It is also desirable that rotating transfer apparatuses in which a plurality of spout holding members are disposed on the circumferences of continuously rotating rotors be disposed between the respective sealing apparatuses (i.e., the spout insertion and temporary-sealing apparatus, main-sealing apparatus (primary sealing apparatus and secondary sealing apparatus) and cold-sealing apparatus), and that bags that have attached spouts be transferred from sealing apparatuses on the upstream side to sealing apparatuses on the downstream side via the rotating transfer apparatuses. Since various types of processing means are disposed on the circumferences of rotors in the respective sealing apparatuses (e.g., main-sealing means in the case of the main-sealing apparatus), there is a danger that the processing means will interfere with each other if the bags that have attached spouts are directly transferred between the sealing apparatuses. However, this danger can be avoided by interposing the rotating transfer apparatuses. By interposing such rotating transfer apparatuses, it is possible to increase the working region (i.e., the rotational angle of the rotor that can be used for sealing work) in each sealing apparatus compared to a case in which the respective sealing apparatuses are simply disposed in a row.

It is also desirable that spouts have one or more laterally oriented projecting strips formed on the sealing portions and the temporary sealing of the sealing portions and bags be performed so that the projecting strips are prevented from the temporary sealing.

Furthermore, the above object is accomplished by a unique structure for a spout sealing apparatus of the present invention that comprises:

a spout insertion and temporary-sealing apparatus in which:
  a plurality of spout holding members that hold spouts are disposed on a circumference of a continuously rotating rotor,
  insertion means that fit bags over the spouts that are held by the spout holding members are disposed so as to correspond to the respective spout holding members, and
  a temporary-sealing apparatus is disposed near the rotor so as to temporarily seal the bags and the spouts held by the spout holding members;
a spout main-sealing apparatus in which:
  a plurality of spout holding members that hold spouts are disposed on a circumference of a continuously rotating rotor, and
  main-sealing means that perform a main sealing of the bags with attached spouts that are held by the spout holding members are disposed so as to correspond to respective the spout holding members, and
a rotating transfer apparatus in which a plurality of spout holding members that hold spouts are disposed on a circumference of a continuously rotating rotor, and wherein
  the rotating transfer apparatus is disposed between the spout insertion and temporary-sealing apparatus and the spout main-sealing apparatus, so that the rotating transfer apparatus continuously transfers bags with attached spouts from the spout insertion and temporary-sealing apparatus to the spout main-sealing apparatus.

In the above structure, the spout main-sealing apparatus can be constructed from a primary sealing apparatus and a secondary sealing apparatus. In both of which, a plurality of spout holding members that hold spouts are disposed on the circumference of a continuously rotating rotor, and main-sealing means that perform the main sealing of the bags with attached spouts held by the spout holding members are disposed so as to correspond to the respective spout holding members. In this case, a rotating transfer apparatus similar to that described above is disposed between the primary sealing apparatus and secondary sealing apparatus, and bags with attached spouts are continuously transferred from the primary sealing apparatus to the secondary sealing apparatus via this rotating transfer apparatus.

Furthermore, a spout cold-sealing apparatus can be further disposed on the downstream side of the spout main-sealing apparatus. In the spout cold-sealing apparatus, a plurality of spout holding members that hold spouts are disposed on the circumference of a continuously rotating rotor, and cold-sealing means that cold-seal the bags with attached spouts that are held by the spout holding members are disposed so as to correspond to the respective spout holding members. In this case also, a rotating transfer apparatus similar to that described above is disposed between the spout main-sealing apparatus and the spout cold-sealing apparatus, and bags with attached spouts are continuously transferred from the spout main-sealing apparatus to the spout cold-sealing apparatus via this rotating transfer apparatus. If necessary, such a similar rotating transfer apparatus may also be disposed on the downstream side of the cold-sealing apparatus, so that bags that have attached spouts are transferred from the cold-sealing apparatus to the apparatus of the next process via this rotating transfer apparatus.

In the above spout sealing apparatus, a defective bag discharge device can be attached to one or more of the rotating transfer apparatuses. In cases where the spout holding members disposed on the respective rotors of the spout sealing apparatus are, for instance, fork-shaped members which have clamping grooves that face radially outward and clamp groove portions located between flanges on the spouts, such defective bag discharge devices can be equipped with for instance: a discharge member which contacts the spouts of defective bags held by the spout holding members and pushes the spouts outward in the radial direction; and an advancing-and-retracting mechanism which advances and retracts the discharge member between a retracted position and a contact position.

Furthermore, the spout holding members disposed on the respective rotors of the spout sealing apparatus are, for example, fork-shaped members which have: clamping grooves that face radially outward and clamp groove portions located between flanges on the spouts, and tapered surfaces that open outward are formed in the vicinity of the entry point of the clamping groove in each spout holding member. In this case, guide members which transfer bags with attached spouts from spout holding members disposed on the rotor located on the upstream side to spout holding members disposed on the rotor located on the downstream side are provided between adjacent rotors. The guide members are equipped with, for instance, downward-facing grooves which are continuously curved from the conveying track of the centers of spout holding positions of the spout holding members disposed on the rotor located on the upstream side to the conveying track of the centers of the spout holding positions of the spout holding members disposed on the rotor located on the downstream side, and the head portions of the spouts are inserted into the grooves and guided along the grooves. When such guide members are installed, a gap is set between the conveying track of the centers of the spout holding positions of the spout holding members disposed on the rotor located on the upstream side and the conveying track of the centers of the spout holding positions of the spout holding members disposed on the rotor located on the downstream side, and the groove passes through more or less the central position of this gap in the position where the two conveying tracks are in closest proximity to each other.

In the above spout insertion and temporary-sealing apparatus, the temporary-sealing apparatus can be provided with a heated rotating sealing body. The heated rotating sealing body is disposed in close proximity to the outer circumferential side of the rotor and rotates at the same speed as the spouts held by the spout holding members. It is desirable that back-up members which advance and retract in the radial direction be installed on the inner circumferential side of the rotor so as to correspond to the respective spout holding members. The rotating sealing body contacts the sealing portions of the spouts with the bags fitted thereon, and the back-up members advance outward in the radial direction upon arrival at the temporary sealing position and contact the insides of the sealing portions of spouts with the bags fitted thereon, thus supporting the bags from the inside.

Alternatively, the temporary-sealing apparatus an be equipped with, for instance, a heated sealing body which is disposed in close proximity to the outer circumferential side of the rotor and follows for a specified distance the rotation of the spouts held by spout holding members. This heated sealing body repeatedly advances and contacts the sealing portions of the spouts with the bags fitted thereon that are held by the spout holding members, follows the rotation of the bags for a specified distance, and then withdraws and returns to its original position.

BRIEF DESCRIPTION OF THE DRAWINGS

FIG. 17A is a sectional view of a defective bag discharge device installed in the transfer apparatus, FIG. 17B is a partial top view thereof, and FIG. 17C is a partial side view thereof.

DETAILED DESCRIPTION OF THE INVENTION

Below, the spout sealing apparatus of the present invention will be described more concretely with reference to FIGS. 1 through 17.

Figure 1:
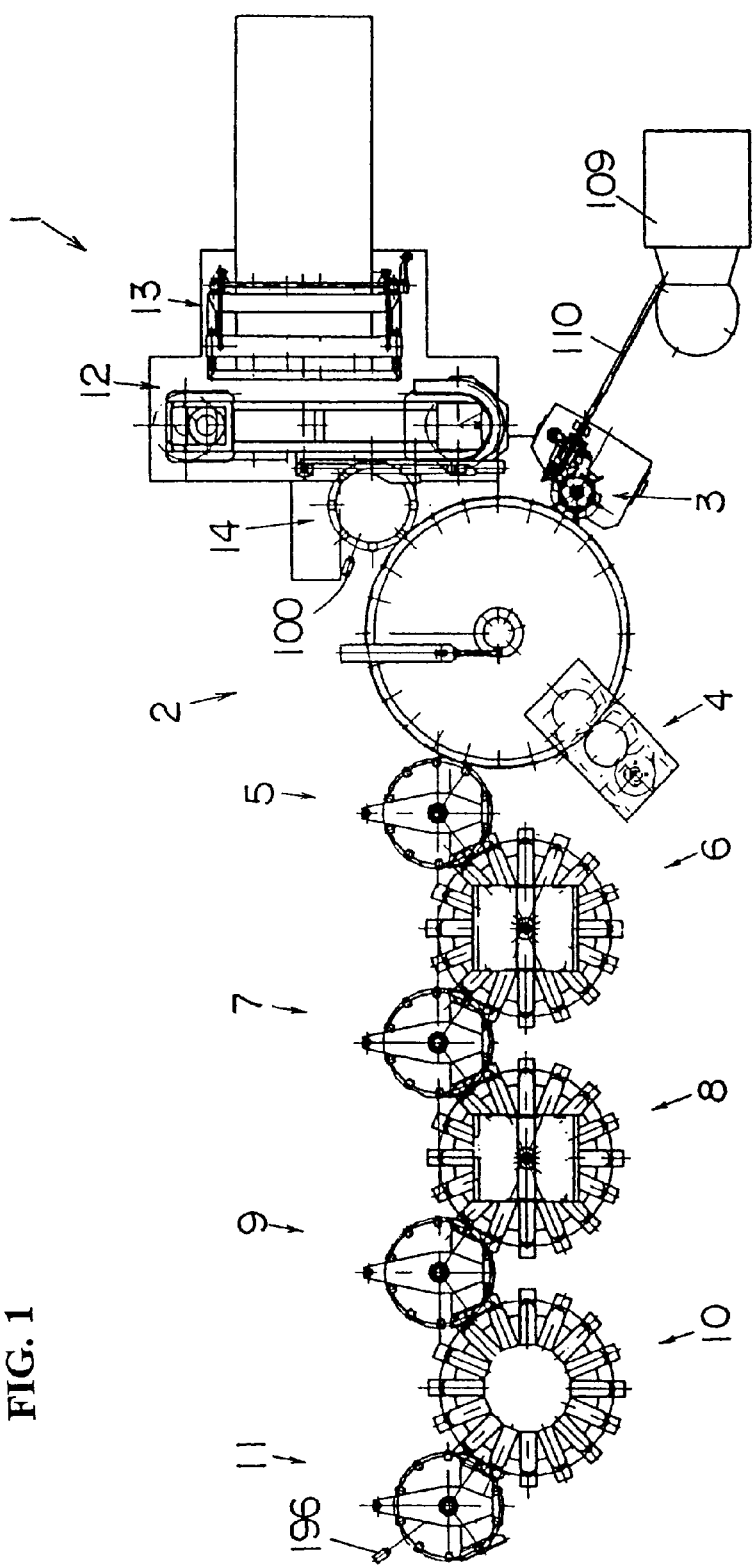
FIG. 1 is a schematic top view of the spout sealing apparatus of the present invention.
Figure 2A:
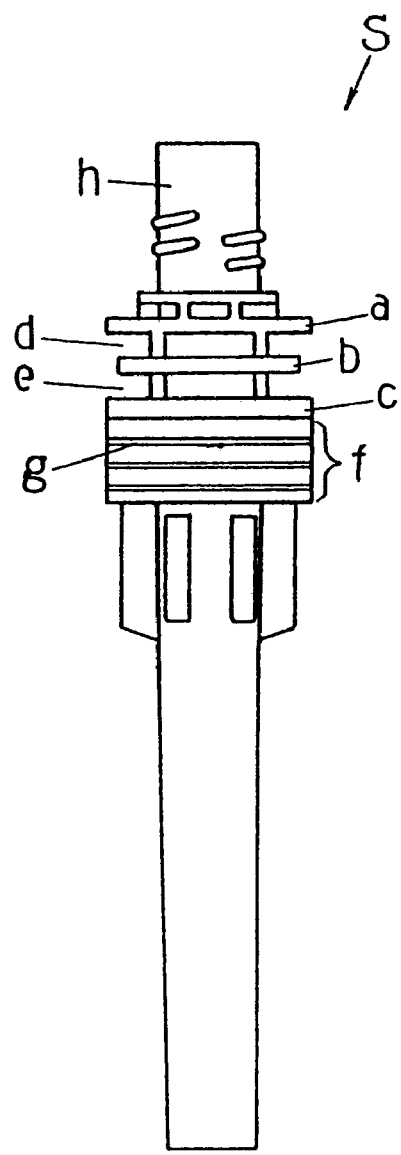
FIG. 2A is a top view of one of the spouts.
Figure 2B:
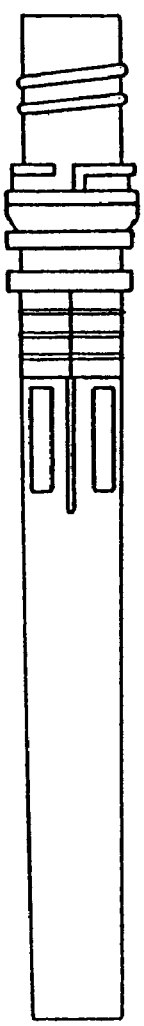
FIG. 2B is a side view thereof.

FIG. 1 is a top view of the spout sealing apparatus. Here, bags are supplied to a spout insertion and temporary-sealing apparatus 2 from a continuous bag supply device 1, and spouts S (see FIG. 2) are supplied to this spout insertion and temporary-sealing apparatus 2 from a spout supply device 3. Inside the spout insertion and temporary-sealing apparatus 2, the bags are fitted over the spouts (i.e., the spouts are inserted into the bags), and temporary sealing is performed on the sealing portions by a temporary-sealing apparatus 4 so that the bags and spouts are connected. A primary sealing apparatus 6 is disposed in a line with the spout insertion and temporary-sealing apparatus 2, with a rotating transfer apparatus 5 interposed. Likewise, a secondary sealing apparatus 8 is disposed in this line with a rotating transfer apparatus 7 interposed, and a cold-sealing apparatus 10 is disposed in this line with a rotating transfer apparatus 9 interposed. Furthermore, the sealed bags that have attached spouts are transferred to the apparatus of the next process (e.g., an apparatus for conveying bags with attached spouts; not shown) via a rotating transfer apparatus 11. Furthermore, a, b and c in the spouts S indicate flange portions, and groove portions d and e located between the flange portions are clamped by the spout holding members 29 that will be described below. The groove portions d and e are all formed by flat surfaces. Furthermore, f indicates sealing portions.

The continuous bag supply device 1 can be the same as the continuous bag supply device described in the U.S. patent application Ser. No. 09/523856 which was filed by the present applicant. This continuous bag supply device 1 comprises a bag conveying device 12, bag supply devices 13 and a transfer apparatus 14. Of these parts, the bag-conveying device 12 conveys a plurality of bag holding members disposed at equal intervals in one direction along an annular track that has a pair of parallel sections. On one side of the parallel sections, conveying is performed intermittently with each conveying movement being performed for a distance that is an integral multiple of the attachment spacing of the bag holding members, and on the other side of the parallel sections, conveying is performed continuously at a constant speed. A plurality of bag supply devices 13 are disposed side by side on the upstream side of the bag conveying device 12 (i.e., on one side of the parallel sections), and a plurality of bags are simultaneously supplied to the bag holding members in an intermittent supply action. The transfer apparatus 14 is disposed on the downstream side of the bag-conveying device (i.e., on the other side of the parallel sections). The transfer apparatus 14 continuously receives bags from the bag holding members, and continuously supplies the bags to the insertion means (especially the holding members and bag bottom receiving stands; described later) of the spout insertion and temporary-sealing apparatus 2. Furthermore, some universally known continuous bag supply device other than the continuous bag supply device 1 may also be used for the continuous supply of bags to the insertion means of the spout insertion and temporary-sealing apparatus 2.

Figure 3:
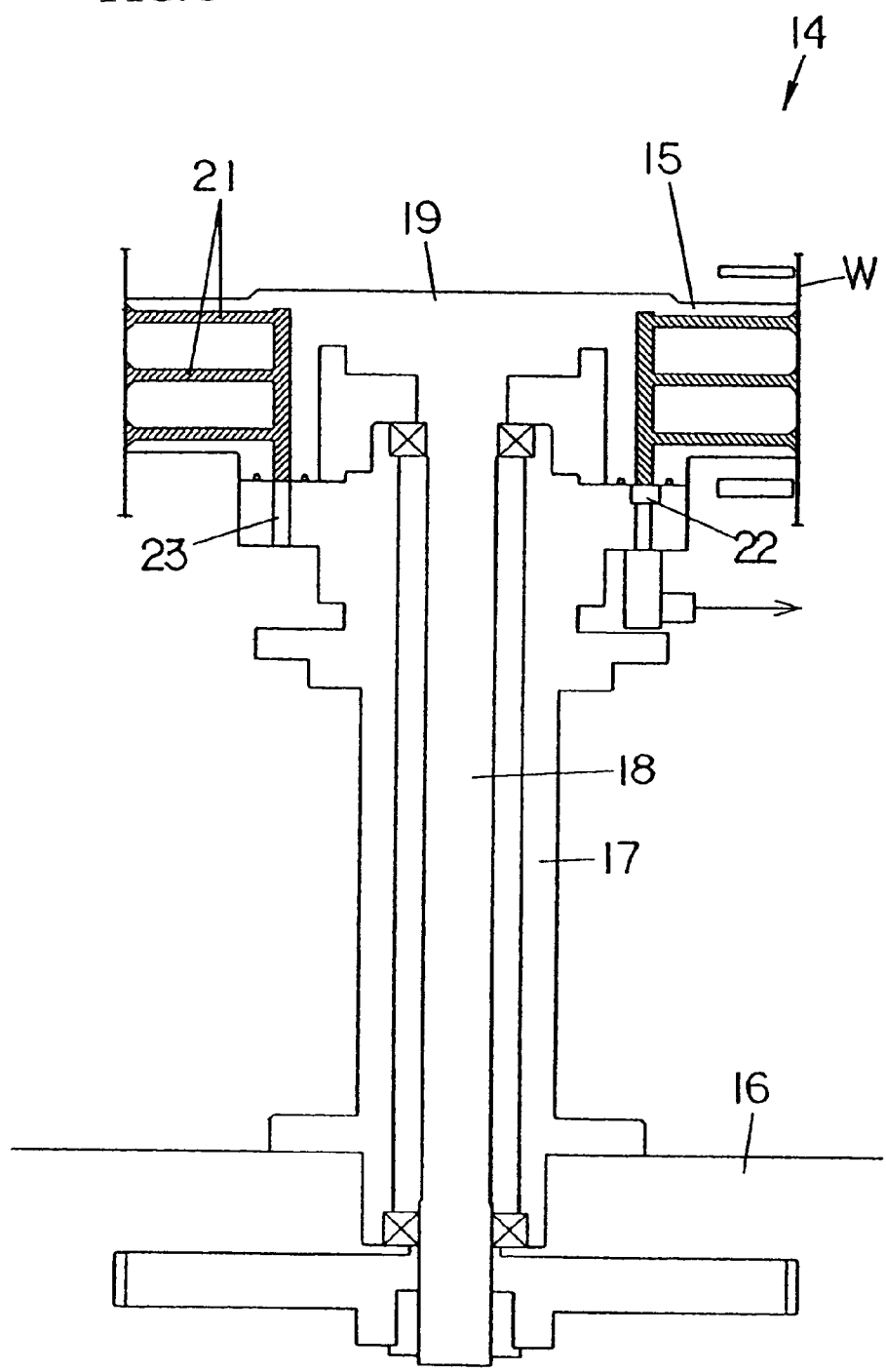
FIG. 3 is a sectional view of the transfer apparatus.

Here, of the various parts of the continuous bag supply device 1, only the transfer apparatus 14, which is directly related to the spout insertion and temporary-sealing apparatus 2, will be described. As shown in FIG. 3, this transfer apparatus 14 is a rotary type transfer apparatus which is equipped with a plurality of transfer means 15 disposed at equal intervals (i.e., at the same spacing as the attachment spacing of the bag holding members of the bag conveying device 12) on the outer circumference of the apparatus, and is equipped with a supporting stand 17 which is installed in an upright position on a base 16, and a rotor 18 continuously rotated by a driving motor (servo motor) that is not shown. Transfer means 15 which hold bags W by vacuum suction are formed in the circumferential surface of the rotor head 19, and vacuum passages 21 formed in the rotor head 19 open in the side surfaces of the transfer means 15. The vacuum passages 21 are connected to a vacuum pump (not shown) via vacuum ports 22 formed in the supporting stand 17 up to a point where the vacuum passages 21 have completed approximately ⅝ of a revolution from the position facing the bag conveying device 12, and are connected to an atmosphere-release port 23 in a position in which the vacuum passages 21 have completed approximately ⅝ of a revolution.

The transfer means 15 of the transfer apparatus 14 continuously rotate in the horizontal plane at the same speed and at a matched timing with the bags W that are continuously conveyed along the other side of the parallel sections of the bag conveying device 12. The transfer means 15 continuously chuck and receive the bags W, and then transfer the bags W to the spout insertion and temporary-sealing apparatus 2 after completing ⅝ of a revolution.

Figure 4:
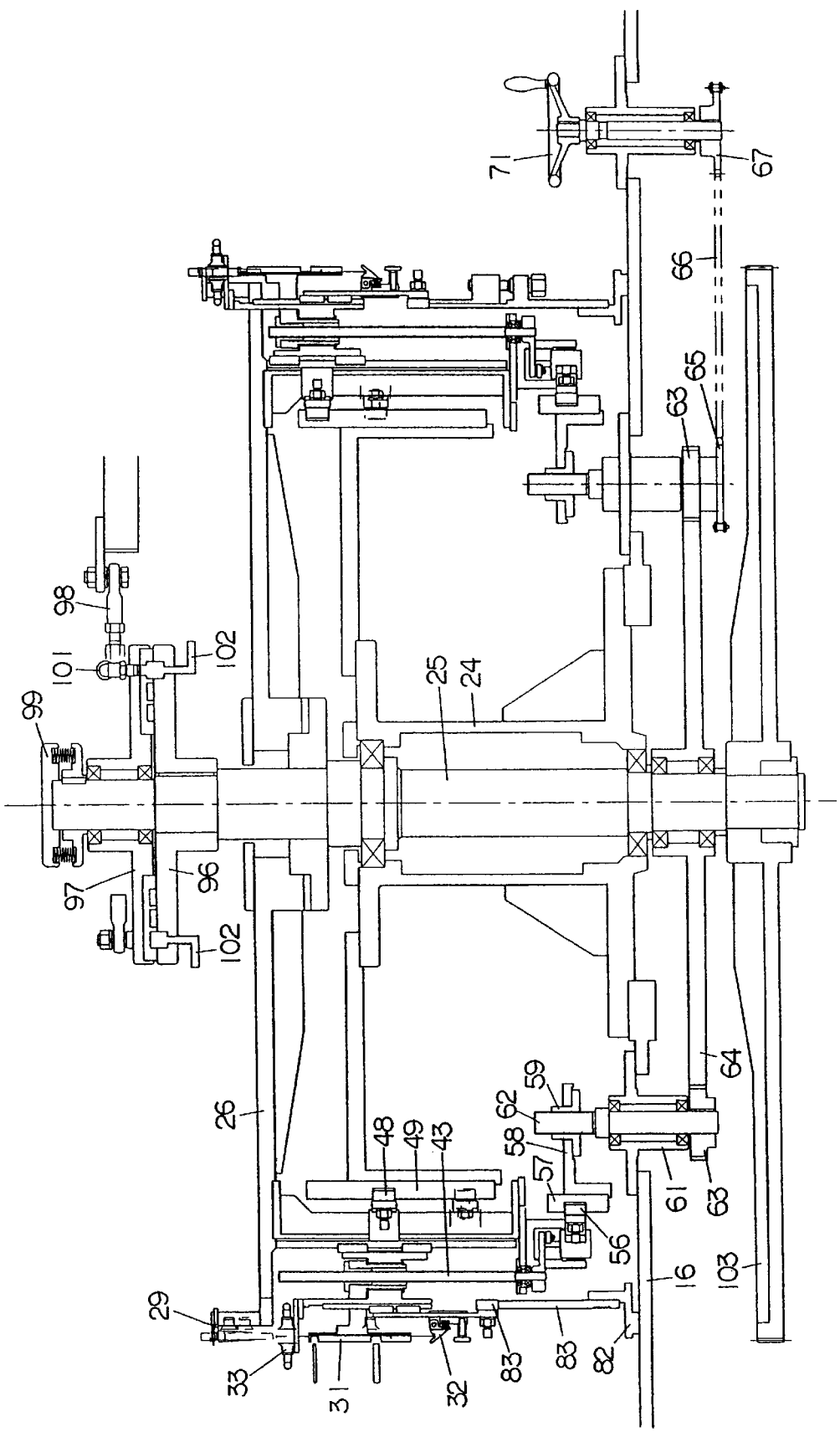
FIG. 4 is a sectional view of the spout insertion and temporary-sealing apparatus.
Figure 5:
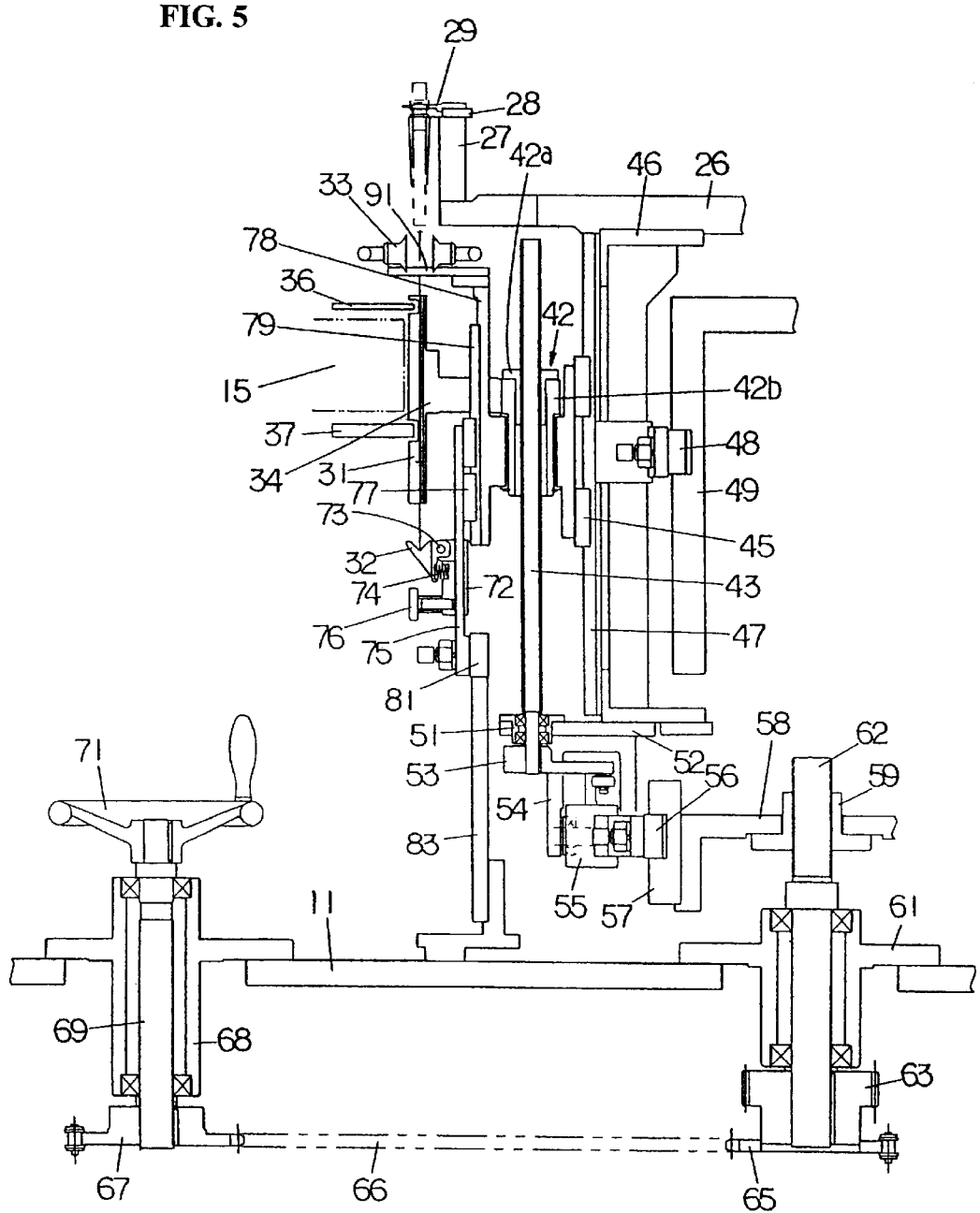
FIG. 5 is an enlarged sectional view of the spout insertion and temporary-sealing apparatus.

The spout insertion and temporary-sealing apparatus 2 is a rotary type apparatus; in this apparatus, as shown in FIGS. 4 and 5, a table rotating shaft 25 is rotatably supported inside a supporting stand 24 which is installed in an upright position on a base 16. A rotating table (rotor) 26 is fastened to the table rotating shaft 25, and spout holding members 29 are attached to the outer circumference of this rotating table 26 at equal intervals (i.e., with the same spacing as the installation spacing of the transfer means 15 of the transfer apparatus 14) via upright attachment supporting columns 27 and attachment plates 28. The rotating table 26 rotates continuously, and is set so that the spout holding members 29 and transfer means 15 rotate at the same speed and with matched timing. As shown most clearly in FIG. 7, the spout holding members 29 are fork-shaped members which have a clamping groove 29a that faces radially outward and clamps the groove portions located between the flanges of the spouts S, and tapered surfaces that spread outward in a fan shape are formed in the vicinity of the entry point of this clamping groove 29a. Furthermore, the attachment plates 28 are annular members, and have a recessed portion 28a (see FIG. 6B) formed in the area of the spout holding member 29, so that there is no interference with the clamping of the spouts. Furthermore, the attachment plates 28 also function as stopper members which are contacted by the upper ends of the bags so that the rising ends are restricted.

A pair of holding members 31, a bag bottom receiving stand 32 and a pair of suction plates 33 which constitute the insertion means referred to in the present invention are respectively disposed beneath each spout holding member 29.

Figure 6B:
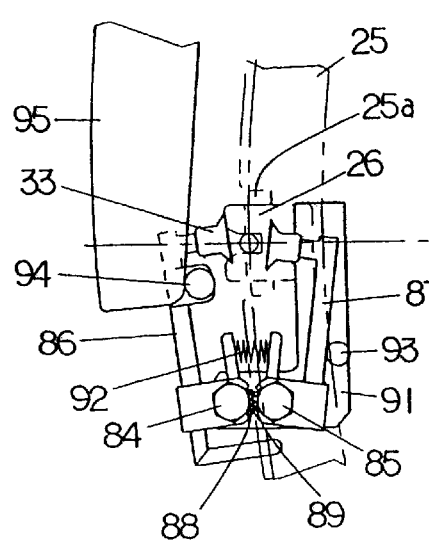
FIG. 6B is a partial top view of the opening-and-closing mechanism of the suction plates.
Figure 6A:
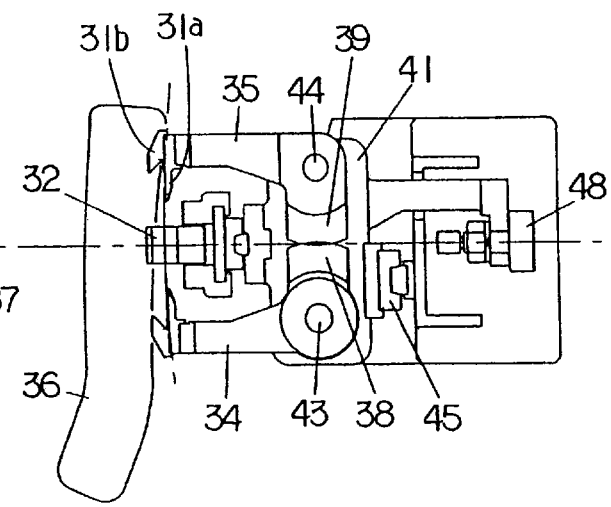
FIG. 6A is partial top view of the opening-and-closing mechanism of the holding members.

As shown in FIG. 6A, the holding members 31 are members that are substantially V-shaped as seen in a top view, and that each comprises an inner claw 31a and an outer claw 31b. The holding members 31 have a specified length in the vertical direction, and are respectively attached to the tip ends of pivoting holding arms 34 and 35. Furthermore, the holding members 31 open and close by swinging through a specified range. In an open state, the holding members 31 receive bags W; the holding members 31 then close and hold both side edges of the bags W. The inner claws 31a have linear holding surfaces that run more or less along a line tangential to the rotational track. The outer claws 31b have holding surfaces that face slightly outward, and the paired claws are positioned so that they face each other, with the gap between the inner claws 31a being set at a value that is narrower than the gap between the outer claws 31b. Furthermore, the holding members 31 have cutouts in two places above and below, and bag introduction guides 36 and 37 disposed above and below the transfer means 15 of the transfer apparatus 14 are positioned here.

Gears 38 and 39 are interposed between the holding arms 34 and 35 so that the holding arms 34 and 35 simultaneously pivot in an opening and closing action. Furthermore, the holding arm 34 is held so that it is pivotable on raising-and-lowering holder 41 via a bearing 42 (inner race 42a and outer race 42b), and an arm-swinging fulcrum shaft 43 is inserted into the inner race 42a. Longitudinal ribs are formed on the outer circumferential surface of the arm-swinging fulcrum shaft 43, and longitudinal grooves which accommodate the longitudinal ribs so that the ribs can slide are formed on the inner circumferential surface of the inner race 42a, thus allowing the bearing 42 (and raising-and-lowering holder 41) to rise and fall relative to the arm-swinging fulcrum shaft 43. Meanwhile, the holding arm 35 is arranged so that it is pivotable with respect to the raising-and-lowering holder 41 via an arm-swinging fulcrum shaft 44.

A raising-and-lowering slider 45 is fastened to the inner circumferential side of the raising-and-lowering holder 41 (center side of the rotating table 26), and this slider 45 slides along a raising-and-lowering rail 47 which is vertically installed on a bracket 46 attached to the undersurface of the rotating table 26. Furthermore, a cam roller 48 is disposed on the inside of this slider 45, and as the rotating table 26 rotates, this cam roller 48 runs through the cam groove of an annular raising-and-lowering cam 49 which is attached to the supporting stand 24. As a result, the raising-and-lowering holder 41 is raised and lowered (along with the holding members 31).

The arm-swinging fulcrum shaft 43 is supported so that it is pivotable by a bearing 51 in the vicinity of the lower end of the arm-swinging fulcrum shaft 43. The bearing 51 is attached to a supporting plate 52 which is fastened to the lower end of the bracket 46. A swinging arm 53 is fastened to the lower end of the arm-swinging fulcrum shaft 43, and this swinging arm 53 is connected via a connecting rod (not shown) to one end of a cam lever 55 which is shaft-supported on a bracket 54 on the undersurface of the supporting plate 52 so that the cam lever 55 is free to swing (in a relationship which is such that swinging arm 53 swings in the horizontal plane when the cam lever 55 swings). A cam roller 56 is disposed on the other end portion of the cam lever 55, and this cam roller 56 runs through the cam groove 57 of an annular opening-and-closing cam 57 as the rotating table 26 rotates. As a result, the swinging arm 53 swings and the arm-swinging fulcrum shaft 43 pivots so that the holding arms 34 and 35 swing and the holding members 31 open and close.

The opening-and-closing cam 57 is fastened to the outer circumference of an annular attachment bracket 58. A plurality of female screw members 59 are disposed on the circumference of this attachment bracket 58, and rotating shafts 62 which are rotatably supported on a stand 61 disposed on the base 16 are engaged with the female screw members 59, so that the attachment bracket 58 is supported in a horizontal position. Gears 63 are attached to the lower ends of the rotating shafts 62, and the gears engage with the outer circumference of an intermediate gear 64 which is rotatably attached to the table-rotating shaft 25. Furthermore, a sprocket 65 is fastened to one of the gears 63, and this is connected via a chain 66 and sprocket 67 to a rotating shaft 69 which is supported so that the rotating shaft 69 is rotatable on a stand 68 disposed on the base 16. Accordingly, when a handle 71 which is fastened to the rotating shaft 69 is turned, the plurality of rotating shafts 62 rotate by the same amount, so that the bracket 58 and opening-and-closing cams 57 are raised and lowered while maintaining a horizontal attitude. Furthermore, the height of the opening-and-closing cams 57 is adjusted in accordance with the width of the bags.

A bag bottom receiving stand 32 is disposed beneath each pair of holding members 31. This bag bottom receiving stand 32 has a receiving section which is substantially V-shaped as seen in a side view and is elastically supported on a receiving stand holder 72 via a supporting shaft 73 and compression spring 74; the receiving stand holder 72 is fastened to a receiving stand attachment plate 75 by a height adjustment screw 76. A raising-and-lowering slider 77 is fastened to the receiving stand attachment plate 75; furthermore, a raising-and-lowering rail 79 is fastened in a vertical position to a bracket 78 which is attached to the raising-and-lowering holder 41, and the raising-and-lowering slider 77 slides along this raising-and-lowering rail 79. Furthermore, a cam roller 81 is attached to the lower end of the receiving stand attachment plate 75, and as the rotating table 26 rotates, this cam roller 81 runs over an annular receiving stand raising-and-lowering cam 83 which is attached to the base 16 via a bracket 82. As a result, the bag bottom receiving stand 32 is raised and lowered.

In the meantime, when bags of different lengths are processed, it is necessary to adjust the height of the bag bottom receiving stand 32. This adjustment can be done by means of the height adjustment screw 76. Variation in the length of bags that have the same nominal length is absorbed by elastic deformation of the compression spring 74.

A pair of suction plates 33 are positioned above the holding members 31. The respective suction plates 33 are attached facing the tip ends of opening arms 86 and 87 that are free to swing in the horizontal plane about respective swinging fulcrum shafts 84 and 85, and the suction plates 33 simultaneously pivot in an opening-and-closing action via gears 88 and 89. The swinging fulcrum shafts 84 and 85 are fastened to an attachment base 91 which is disposed on the upper end of the bracket 78, so that the suction plates 33 are raised and lowered together with the raising-and-lowering holder 41 (and holding members 31). The opening arms 86 and 87 are constantly driven in the opening direction by a compression spring 92, and the opening distance of the opening arms 86 and 87 is restricted by a stopper 93 which is attached to the attachment base 91. Meanwhile, a cam roller 94 is attached to the opening arm 86; this cam roller 94 contacts an opening arm swinging cam 95 which is disposed over a specified distance along the outer circumference of the rotating table 26, and thus closes the opening arms 86 and 87 and suction plates 33.

A rotary valve consisting of a rotating valve 96 which is fastened to the rotating table shaft 25 and a fixed valve 97 which is attached to the table-rotating shaft 25 so as to be rotatable is disposed on the upper portion of the table-rotating shaft 25. The fixed valve 97 is fixed in place by means of rotation-stopping rod 98, etc., and is elastically pressed against the rotating valve 96 by a pressing plate 99; furthermore, this fixed valve 97 is connected to a vacuum source in a connecting portion 101. Furthermore, the suction plates 33 are connected to respective vacuum ports 102 of the rotating valve 96, and the vacuum ports 102 are placed in communication with vacuum ports formed in the fixed valve 97, or removed from communication with the vacuum ports formed in the fixed valve 97, as the rotating table 26 rotates. Furthermore, a table rotating gear 103 which is connected to a driving source (not shown) is fastened to the lower portion of the table-rotating shaft 25.

In addition, although this is not shown in FIGS. 4 and 5, a temporary-sealing back-up device (described later) is disposed on the rotating table 26.

Figure 7A:
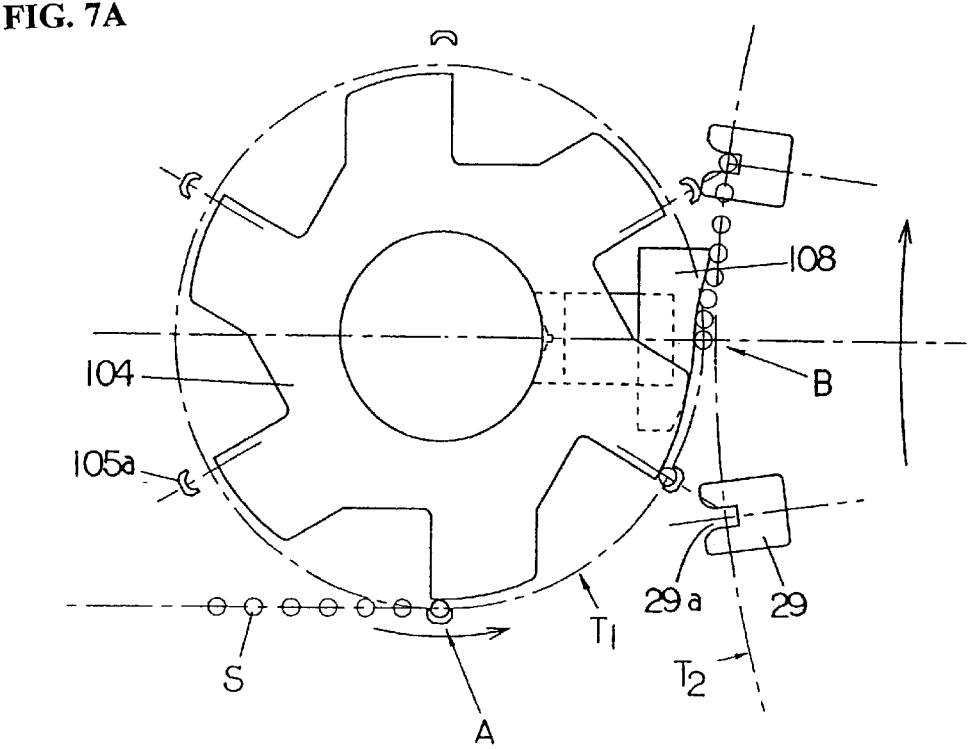
FIG. 7A is a schematic top view of spout transfer by the spout supply device.
Figure 7B:
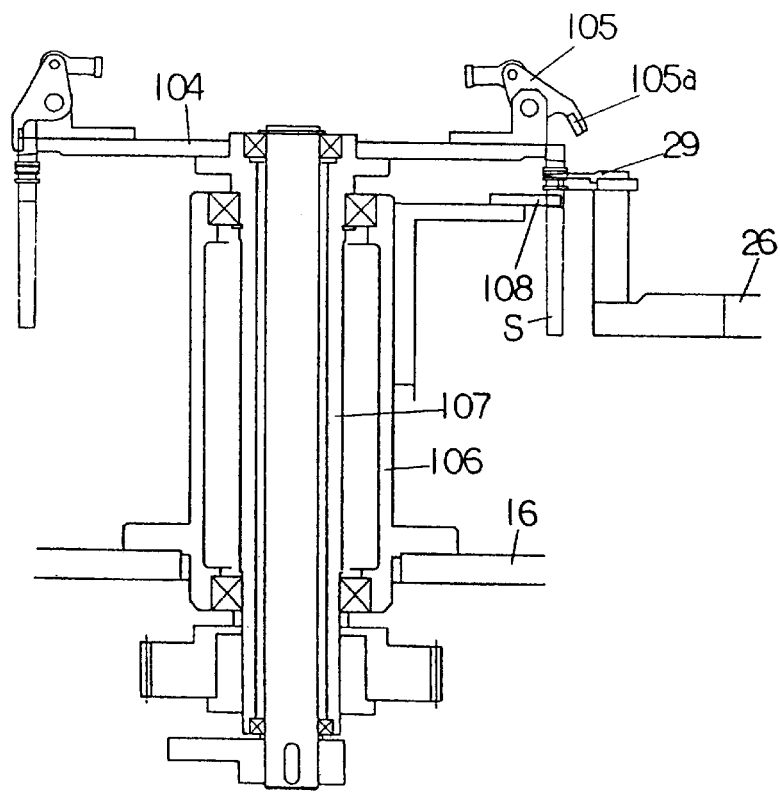
FIG. 7B is a sectional side view.

Next, the spout supply device 3 will be briefly described with reference to FIG. 7. This spout supply device 3 is a rotary type supply device equipped with a plurality of gripping members 105 (only the gripping claws 105a of the gripping members 105 are shown in FIG. 7A) which are free to open and close and which are disposed at equal intervals on the outer circumference of a rotating table 104. The rotating table 104 is disposed on a rotating shaft 107 which rotates inside a supporting stand 106 that is disposed in an upright position on the base 16, and a push-in guide 108 which pushes the spouts out toward the grooves 29a of the spout holding members 29 is disposed on the supporting stand 106. Furthermore, the gripping members 105 are caused to open and close with a specified timing by a mechanism not shown as the rotating table 104 rotates.

In this spout supply device 3, spouts S are guided in a single row over a supply rail 110 from a part feeder 109, and the leading spout S is stopped at the exit and positioned. The rotating table 104 rotates intermittently through a specified angle (60°) at a time in a cycle consisting of stopping, acceleration, constant speed, deceleration and stopping. When the rotating table 104 stops, a spout gripping member 105 stops in the receiving position A for the positioned spout S, and the head portion h of the positioned spout S is gripped between the gripping claw 105a and the outer circumference of the rotating table 104.

Meanwhile, the conveying track $T_1$ of the centers of the spout holding positions of the spout gripping members 105 is set so that it runs in close proximity to the conveying track $T_2$ of the centers of the spout holding positions of the spout holding members 29. The rotating table 104 is rotated at a constant speed before and after the transfer position B (i.e., the position of closest proximity of the two conveying tracks) where spouts are transferred to the spout holding members 29, and it is set so that the spout gripping members 105 rotate at the same speed as the spout holding members 29, and so that both parts run parallel to each other. During this period of constant-speed rotation, the spouts S gripped by the spout gripping members 105 are introduced into the clamping grooves 29a (tapered areas) of the spout holding members 29. After the spouts S have been introduced into the clamping grooves 29a of the spout holding members 29 (at the spout transfer position B or slightly before this position), the spout gripping members 105 are opened and the spouts S are released.

The spouts S clamped by the spout holding members 29 contact the push-in guide 108 at a point located in advance of the transfer position B; as the spout holding members 29 rotate, the spouts S are guided by this push-in guide 108, and are pushed into the centers of the spout holding positions of the clamping grooves 29a.

Figure 8:
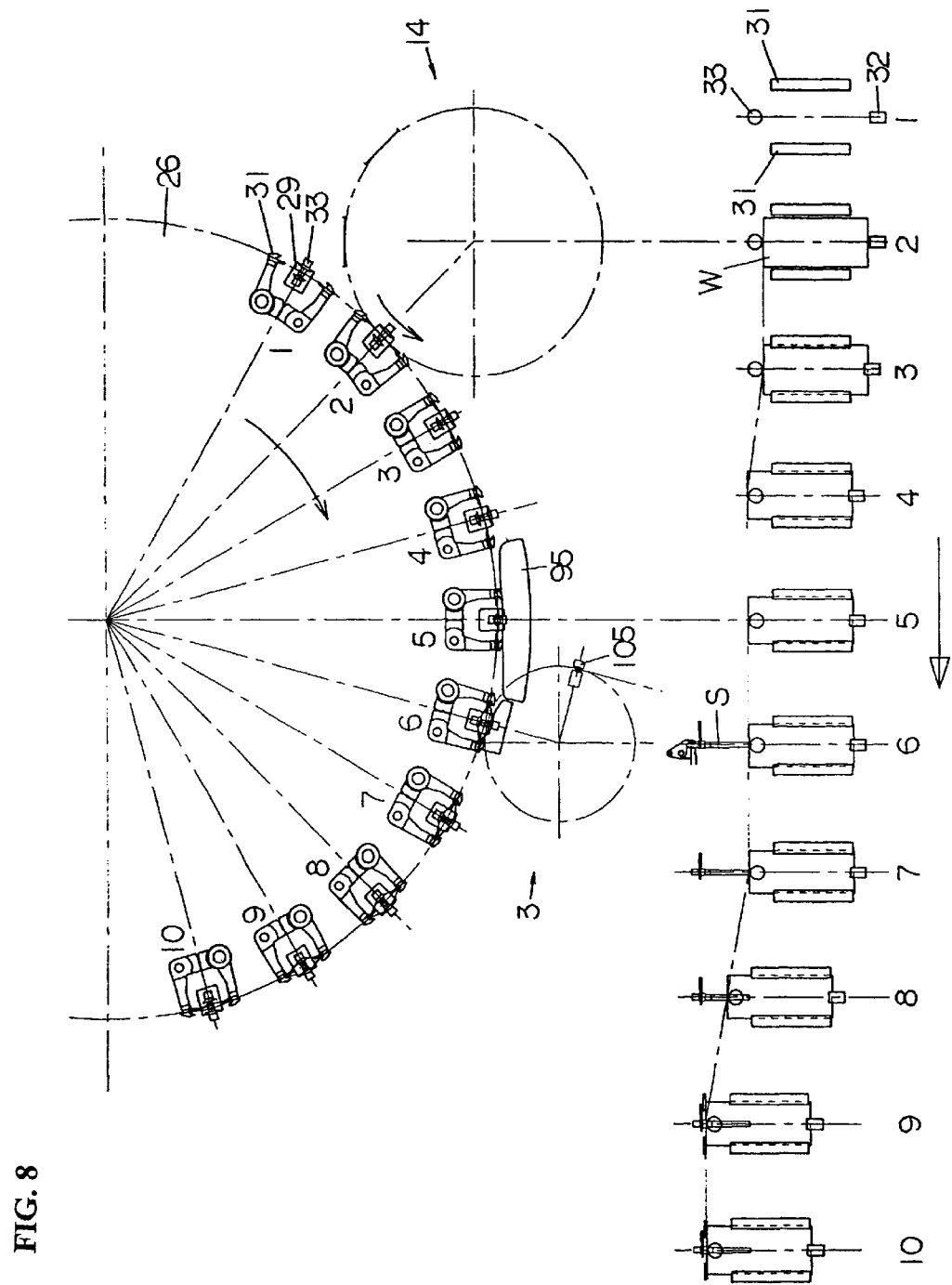
FIG. 8 illustrates the operation of the insertion device.

Next, the operation of the insertion means (holding members 31, bag bottom receiving stand 32 and pairs of suction plates 33) in the spout insertion and temporary-sealing apparatus 2 will be described with reference to FIG. 8. The following numbers in parenthesis more or less correspond to the numbers 1 though 10 shown in FIG. 8.

(1~2) When the continuously rotating transfer means 15 of the transfer apparatus 14 chuck the bags W held by the bag conveying device 12 and rotate by approximately ⅝ of a revolution so that the transfer means 15 approach the holding members 31 of the similarly continuously rotating rotating table 26, the bags W make rubbing contact with the bag introduction guides 36 and 37, so that the bags are guided toward the holding members 31. At the same time, the transfer means 15 are connected to the atmosphere-release port 23 so that suction is stopped; as a result, the bags W chucked by the transfer means 15 to this point are respectively introduced into the gaps between the inner claws 31a and outer claws 31b of the facing holding members 31. Needless to say, the pairs of holding members 31 are opened so that the gap between the two outer claws 31b is greater than the bag width (see FIG. 9A). However, the gap between the two inner claws 31a is always less than the bag width.

Figure 9C:
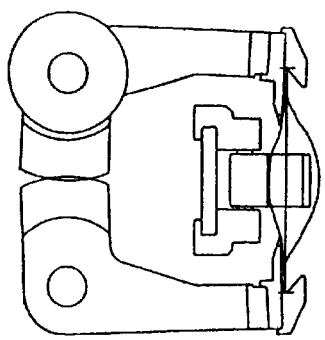
FIGS. 9A, 9B, and 9C illustrates the operation of the holding members.
Figure 9B:
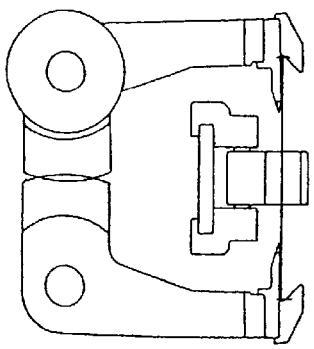
Figure 9A:
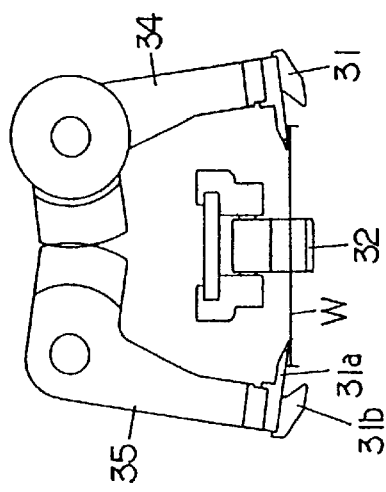

(3) The pair of holding members 31 are closed (in the direction of width), so that the gap between the V-shaped valley parts becomes approximately the same as the bag width, and both side edges of the bags W are thus held (see FIG. 9B). Furthermore, the receiving stand holder 72 begins to rise, and the bag bottom receiving stand 32 raised and receives the lower end of the bag W.

(4) The bag bottom receiving stand 32 is raised further, and positions the mouth of the bag W at an intermediate point between the suction plates 33. The suction plates 33 initiate a suction action at this point.

(5) The cam roller 94 contacts the opening arm swinging cam 95, and the suction plates 33 close and chuck both surfaces of the bag W.

(6) The cam roller 94 separates from the opening arm swinging cam 95, and the suction plates 33 open, so that the bag mouth is opened. At the same time, the holding members 31 are closed further inward (in the direction of width), so that both side edges of the bag are held in accordance with the reduction in the width of the bag that occurs when the mouth of the bag is opened (see FIG. 9C). Meanwhile, a spout S is supplied to the spout holding member 29 from the gripping claws 105 of the spout supply device 3.

(7~9) The raising-and-lowering holder 41 and the receiving stand holder 72 begin to rise at the same time, and the holding members 31, suction plates 33 and bag bottom receiving stand 32 begin to rise at the same time. As a result, both side edges of bags W whose mouths have begun to be opened are held by the holding members 31, and the bags W rise vertically in a state in which the center of the bag in the direction of width is positioned at the center of the spout S, so that the bag is fitted over the spout S. During this period, the suction plates 33 cease to apply suction at the point where the upper end of the bag W crosses the lower end of the sealing portions f of the spout S, so that the bag W is released.

The raising-and-lowering holder 41 and the receiving stand holder 72 rise and stop in a set position; this position is set so that the upper end of the bag W contacts the attachment plate 28 (which functions as a contact member that restricts the rising end of the bag) and stops immediately prior to the stopping of the raising-and-lowering holder 41 and the receiving stand holder 72. When the bag W stops, the bag bottom receiving stand 32 simultaneously ceases any further rise; on the other hand, the raising-and-lowering holder 41 and receiving stand holder 72 continue to rise slightly to a set position, and the rise of the receiving stand holder 72 is absorbed by the compression spring 74. The reason for using such an arrangement is to allow accurate positioning of the upper end of the bag W at the upper end of the sealing portions f of the spout S even if there is some variation in the length of the bags W. Such variation in the length of the bags W is absorbed by the elastic deformation of the compression spring 74.

(10) The bags W and spouts S are rotationally conveyed to the temporary-sealing apparatus 4 in a positioned state.

Furthermore, in FIG. 1, a CCD camera 100 which is used to inspect the front and back surfaces of the bags chucked by the transfer means 15 is disposed in the vicinity of the transfer apparatus 14. The reason for this is that since printing, etc., is performed on the front or back surfaces of the bags in a subsequent process, it is desirable to exclude bags in which the front and back surfaces are reversed from the conveying line beforehand as defective products.

Bags which are judged by the control section to have reversed front and back surfaces (on the basis of images obtained by the CCD camera 100) are discharged from the transfer apparatus 14 or spout insertion and temporary-sealing apparatus 2, or from the subsequent transfer apparatus 5, etc. In cases where such bags are discharged from the spout insertion and temporary-sealing apparatus 2, it is desirable that spouts S not be supplied to the bags from the spout supply device 3, and that temporary sealing not be performed by the temporary-sealing apparatus 4. Furthermore, it would also be possible to install an air-spraying nozzle beneath the rotating table 26 in an intermediate position between the transfer apparatus 5 and transfer apparatus 14, and to operate the air-spraying nozzle on the basis of control signals from the control section, so that defective bags are blown away to the outside here. It is desirable that the position of installation in this case be a position that immediately follows the release of the holding of the bags by the holding members 31.

Figure 10:
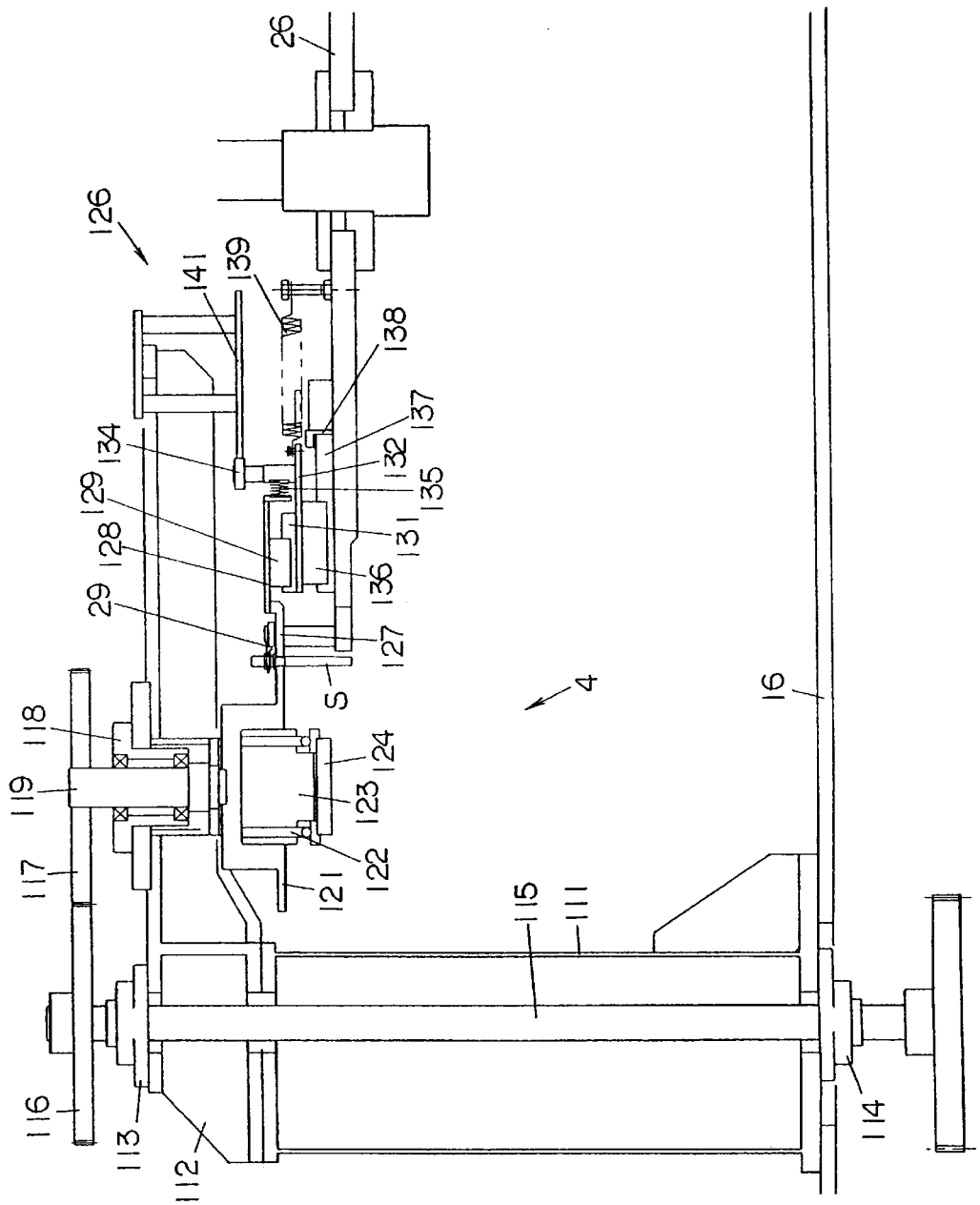
FIG. 10 is a sectional view of the temporary-sealing apparatus.
Figure 11:
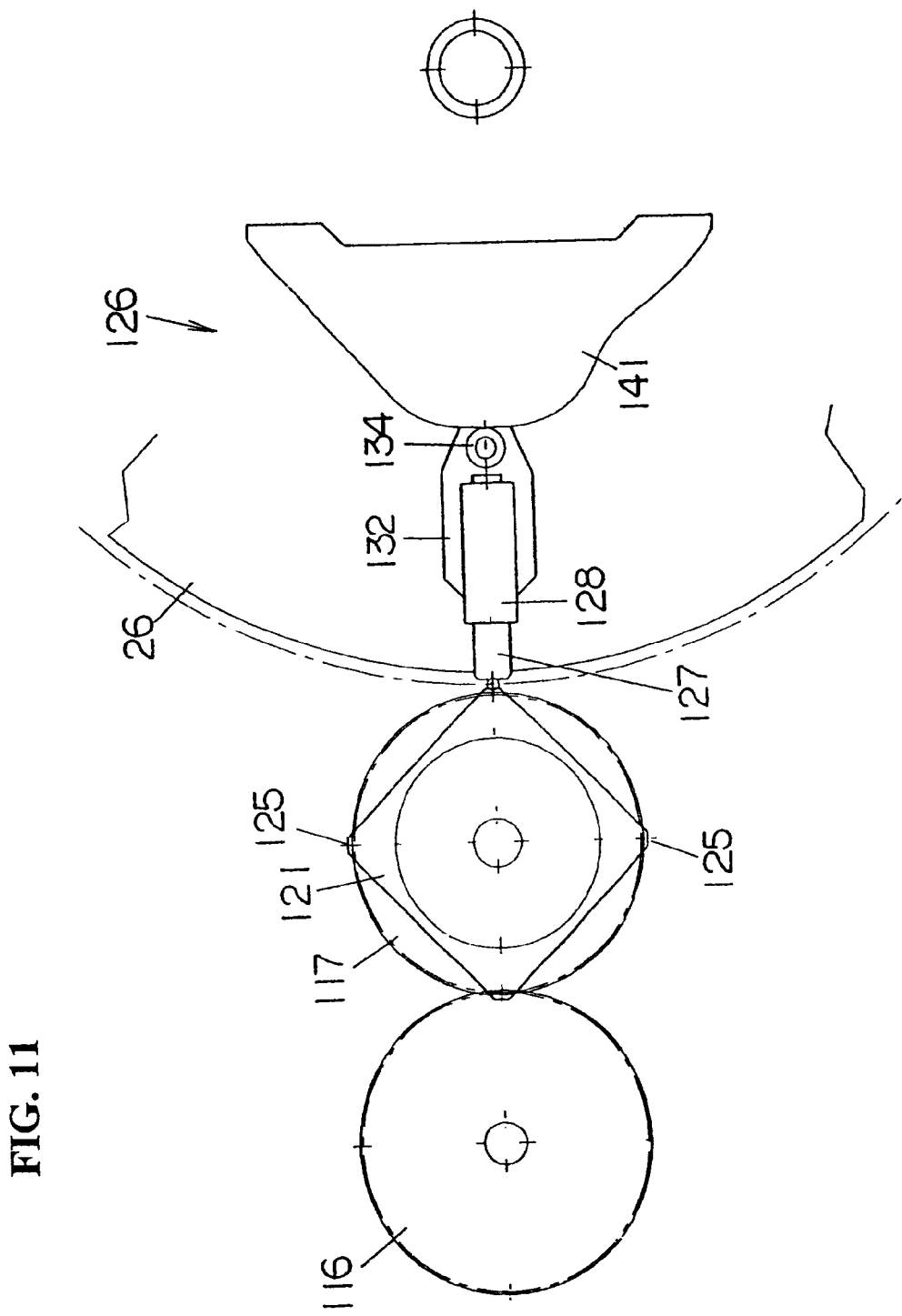
FIG. 11 is a schematic top view thereof.

Next, the temporary-sealing apparatus 4 will be described with reference to FIGS. 10 and 11. The temporary-sealing apparatus 4 is equipped with a supporting stand 111 which is disposed in an upright position on the base 16, a frame 112 which is attached to the upper portion of this supporting stand 111, a rotating shaft 115 which is supported on bearings 113 and 114, a holding shaft 119 which is rotated via gears 116 and 117 and supported on a bearing 118, and a rotating sealing body 121 which is attached to the lower end of the holding shaft 119, etc. A heating block 123 which contains a cartridge heater 122 is fitted into a recessed portion in the rotating sealing body 121, with a slight gap being left between the heating block 123 and the inside surface of the recessed portion. This heating block 123 is fastened to the undersurface of the frame 112 by means of an attachment holder 124. The heat of the heating block 123 is transmitted to the rotating sealing body 121 via the slight gap. Furthermore, this heating may also use some other means such as induction heating, etc.

The rotating sealing body 121 has temporary-sealing portions 125 which are disposed at equal intervals on the circumference of the rotating sealing body 121; as the rotating sealing body 121 rotates, the temporary-sealing portions 125 rotate with a timing that is matched to the spout holding members 29 of the rotating table 26, and the temporary-sealing portions 125 are pushed toward the sealing portions f of the spouts S held by the spout holding members 29. In this position, the bags W are fitted over the spouts S, and the sealing portions of the bags W and the sealing portions f of the spouts S are temporarily sealed.

A back-up device 126 which supports from the inside the spouts S that are pushed inward by the temporary-sealing portions 125 of the temporary-sealing apparatus 4 is disposed on the rotating table 26. This back-up device 126 comprises individual parts that are installed on the rotating table 26 facing each spout holding member 29, and a common part. The individual parts each comprises a pressing plate (referred to as a back-up member in the present invention) 127 which backs up the spout S, an attachment plate 128 for the pressing plate 127, a slider 129 which is disposed on the undersurface of the attachment plate 128, a slide rail 131 for this slider 129, an intermediate plate 132 to which the slide rail 131 is attached, a supporting shaft 133 and cam roller 134 which are disposed on the intermediate plate 132, a compression spring 135 which is interposed between the attachment plate 128 and the supporting shaft 133 and which drives the attachment plate 128 outward in the radial direction, a slider 136 which is disposed on the undersurface of the intermediate plate 132, a slide rail 137 for this slider 136, a stopper 138 for the slider 136, and a tension spring 139 which drives the intermediate plate 132 toward the inner circumference, etc. The common part comprises a back-up cam 141 which is attached to the frame 112, etc. As the rotating table 26 rotates, the cam roller 134 runs along the circumferential surface of the back-up cam 141.

Each pressing plate 127 is retracted inward in the radial direction by the action of the corresponding tension spring 139 until the pressing plate 127 rotates to the temporary-sealing position. When each pressing plate 127 arrives at the temporary-sealing position, the cam roller 134 is pushed by the back-up cam 141 so that the cam roller 134 advances outward in the radial direction, thus causing the corresponding pressing plate 127 to advance so that the tip end of the pressing plate 127 contacts the inside of the sealing portions of the spout S, and backs the sealing portions up from the inside.

When the temporary-sealing portions 125 of the rotating sealing body 121 firmly contact (from the outside) the sealing portions f of the spouts S held by the spout holding members 29 (needless to say, bags are fitted over the spouts at this time), and the insides of the sealing portions f are backed up by the pressing plates 127, the sealing portions f are deformed (i.e., the sealing portions f are slightly crushed). As a result, the contact time between the temporary-sealing portions 125 and the sealing portions f is correspondingly lengthened, so that temporary sealing between the bags and spouts is securely accomplished. However, in cases where there is no back-up device 126, the spouts S do not undergo a crushing deformation (i.e., the spouts S are pushed by the temporary-sealing portions 125 so that the spouts are bent inward in the radial direction from beneath the flange portions c), and in cases where the rotational speed of the rotating table 26 is large, the contact time between the temporary-sealing portions 125 and the sealing portions f is merely an instant, so that temporary sealing cannot be securely accomplished.

Laterally oriented projecting strips g are formed in the sealing portions f of the spouts S; the projecting strips are easily fused, and are preferentially welded to the bags. Therefore, in order to improve the sealability, it is desirable that the projecting strips g be allowed to remain until the main-sealing process is performed. Accordingly, in order to avoid crushing the projecting strips g at the time of temporary sealing, one or more linear seals or point seals are formed in positions that miss the projecting strips g. In this case, linear projecting strips corresponding to the linear seals, or point-form projections corresponding to the point seals, are formed on the temporary-sealing portions 125 of the rotating sealing body 121.

Furthermore, in the above example, only one side of the sealing portions f of each spout is temporarily sealed to the corresponding bag; however, it would also be possible to perform temporary sealing of both sides.

Figure 12A:
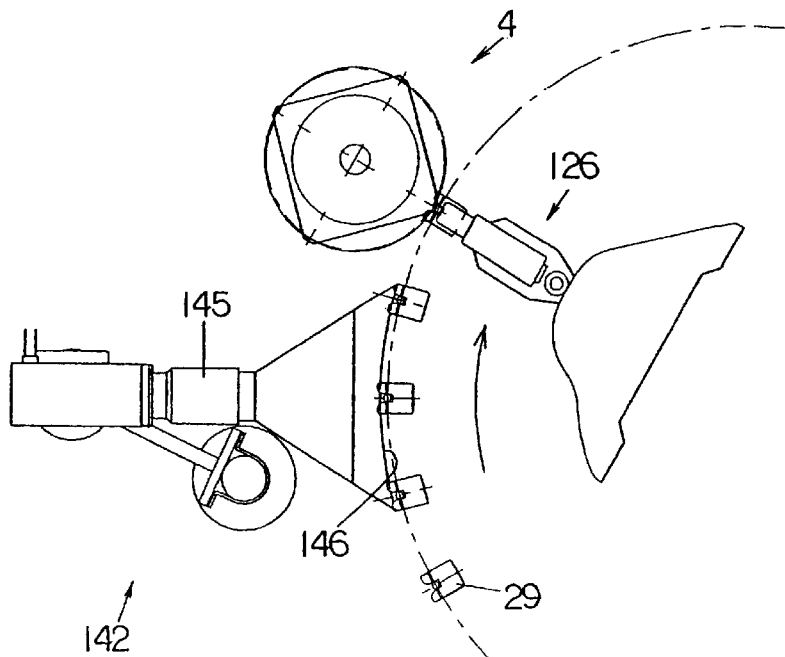
FIG. 12A is a schematic top view of the pre-heating device.
Figure 12B:
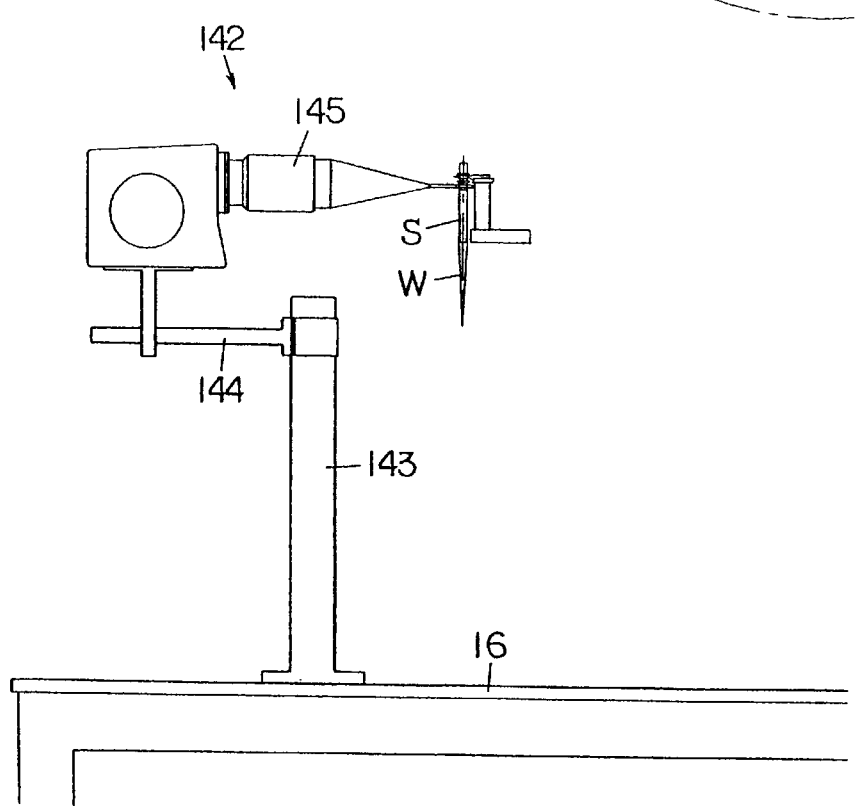
FIG. 12B is a schematic side view thereof.

FIG. 12 shows an example in which a pre-heating device 142 is disposed in the vicinity of the temporary-sealing apparatus 4. A stand 143 is installed in an upright position on the base 16, and a hot air blower 145 is disposed on a bracket 144 which is attached to the stand 143. The opening 146 of this hot air blower 145 faces the position of the sealing surfaces of the spouts S along the outer circumference of the rotating table 26. In this system, hot air is blown onto the spouts S (that have not yet had bags fitted over them) in a position removed from the temporary-sealing apparatus 4, and so that hot air is blown onto the bags that have been fitted over the spouts in a nearby position. As a result of this pre-heating, the reliability of temporary sealing can be increased (and the reliability of the main sealing can also be increased) even if a long contact time cannot be obtained between the sealing portion of the rotating sealing body 121 and the sealing portions f of the spouts S. Furthermore, in this example, the sealing portions f of a given spout S, and then the sealing portions of the bag following the fitting of the bag over the spout S, are pre-heated; however, it would also be possible to heat only the sealing portions of the spouts or the sealing portions of the bags. Furthermore, some other pre-heating means such as infrared radiation, etc., could also be used instead of hot air.

Figure 13:
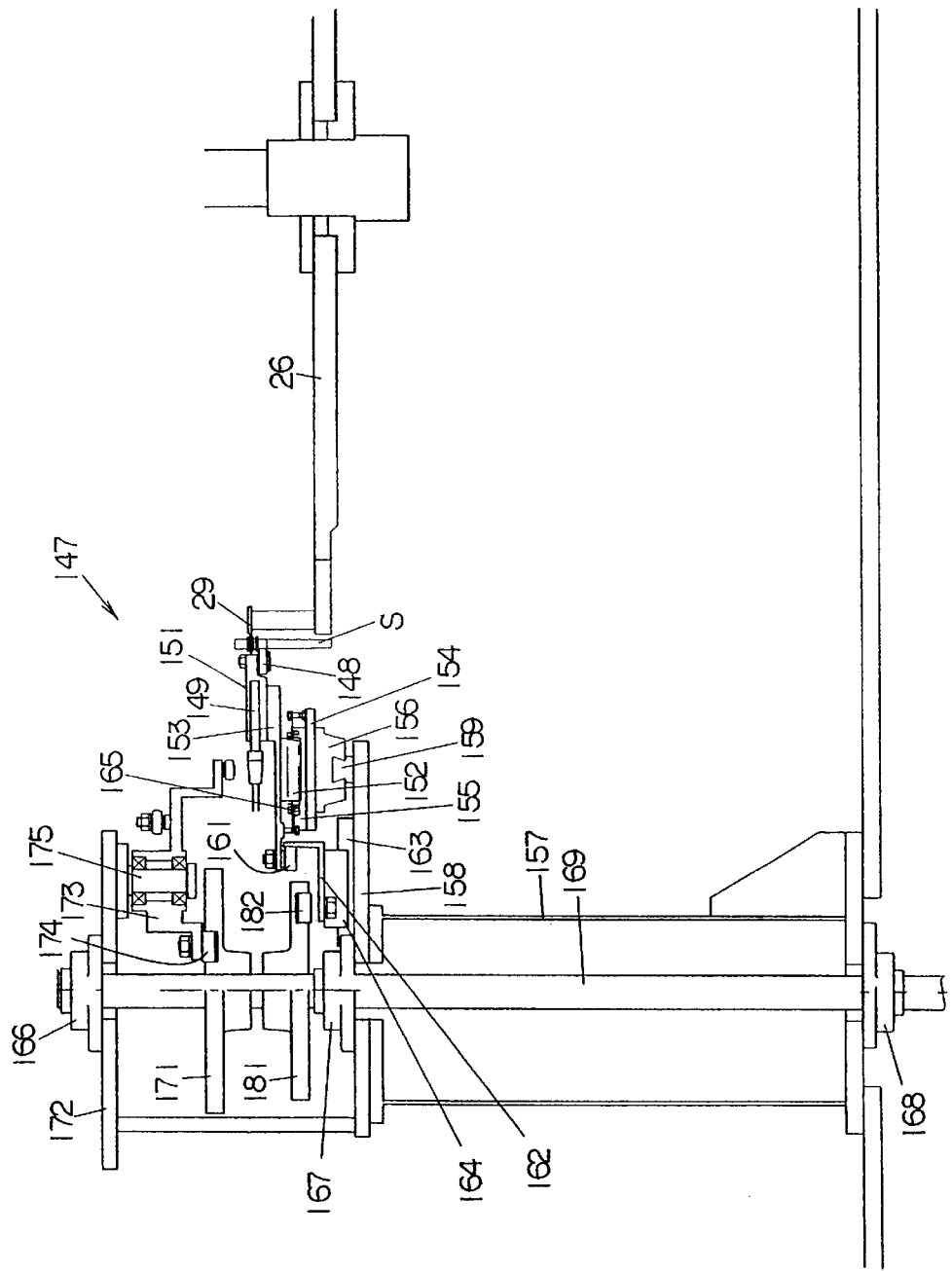
FIG. 13 is a sectional view of another temporary-sealing apparatus.
Figure 14:
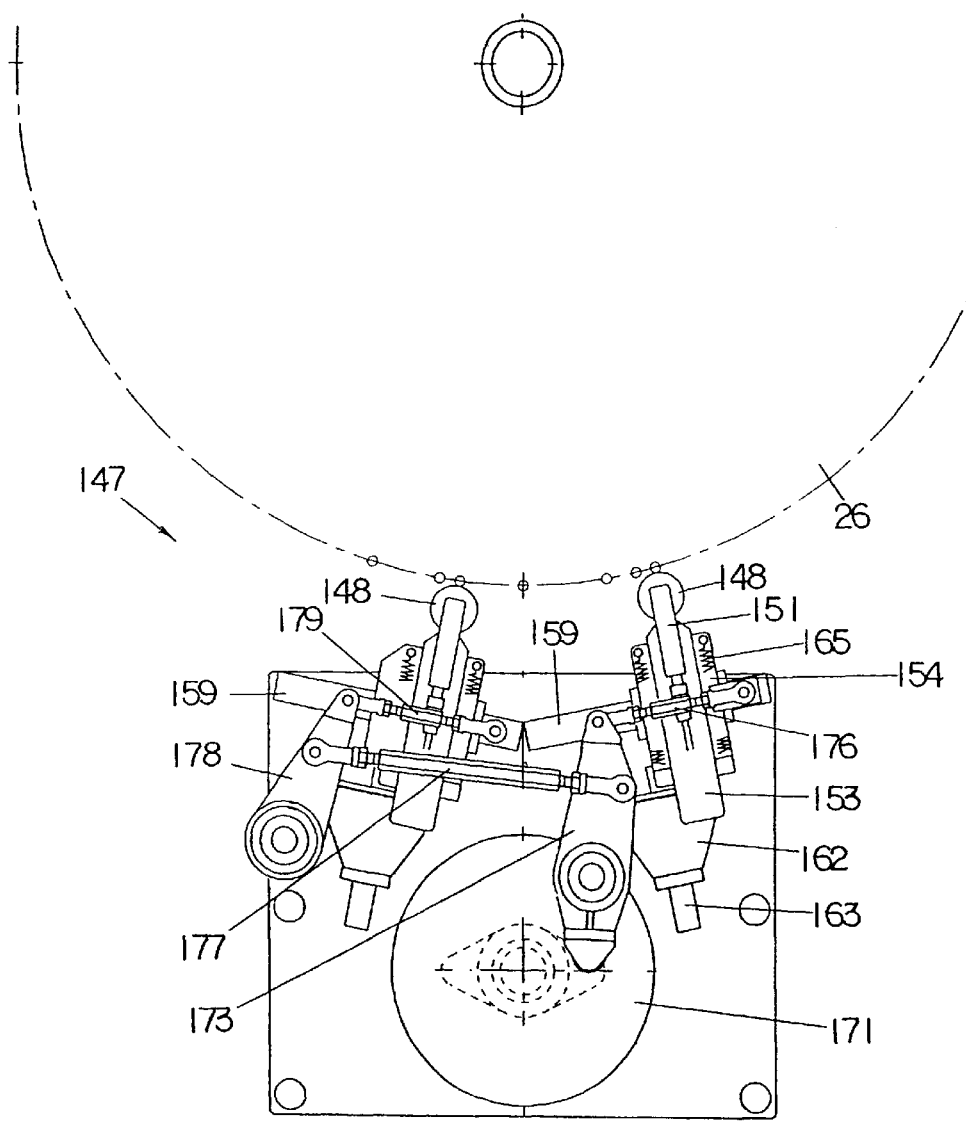
FIG. 14 is a schematic top view thereof.

Another temporary-sealing apparatus 147 will be described with reference to FIGS. 13 and 14. In this temporary-sealing apparatus 147, heated sealing rollers 148 contact the sealing portions f of spouts S held by the spout holding members 29 (needless to say, bags have been fitted over the spouts), and the heated sealing rollers 148 follow the rotation of the rotating table 26 for a specified distance, after which the rollers 148 are separated from the rotating table 26 and return to their original positions. This action is repeated. In the example shown in the figures, the processing efficiency is increased by installing two sealing rollers 148.

The sealing rollers 148 are attached to the tip ends of attachment blocks 151 in which heaters 149 are embedded, so that the sealing rollers 148 are rotatable. The attachment blocks 151 are fastened to attachment plates 153 which have sliders 152 fastened to their undersurfaces. The sliders 152 are slidable along slide rails 155 which are fastened to the upper surfaces of intermediate plates 154, and sliders 156 are fastened to the undersurfaces of the intermediate plates 154. The sliders 156 are slidable along slide rails 159 which are disposed on an attachment base plate 158 installed on a supporting stand 157. The slide rails 155 and 159 are respectively oriented in the radial direction and tangential direction of the rotating table 26; accordingly, the sealing rollers 148 are free to move in the radial direction (advancing and retracting) and tangential direction (tracking) of the rotating table 26.

Furthermore, cam rollers 161 are attached to the rear ends of the attachment plates 153, and the cam rollers 161 are free to run in the horizontal plane along vertical cam surfaces formed on advancing-and-retracting plates 162. Sliders 164 which slide along slide rails 163 disposed on the attachment base plate 158 are fastened to the undersurfaces of the advancing-and-retracting plates 162. Furthermore, tension springs 165 are installed between the attachment plates 153 and intermediate plates 154, and the springs constantly drive the cam rollers 161 toward the cam surfaces. The slide rails 163 are oriented in the radial direction of the rotating table 26. Furthermore, the above-described structure is installed for each of the two sealing rollers 148, 148.

A rotating shaft 169 is supported on the supporting stand 157 via bearings 166 through 168. A following cam 171 is fastened to this rotating shaft 169. As the rotating shaft 169 rotates, a cam roller 174 on one end of a following cam lever 173, which is attached to a ceiling plate 172 so that the following cam lever 173 is pivotable, runs along the cam groove of this following cam 171. As a result, the following cam lever 173 swings about a fulcrum shaft 175. This swinging motion is transmitted to one intermediate plate 154 via a connecting rod 176, and to the other intermediate plate 154 via a connecting rod 177, a following lever 178 which is pivotably attached to the attachment base plate 158, and a connecting rod 179. As a result, both intermediate plates 154 are moved along the slide rails 159.

Furthermore, an advancing-and-retracting cam 181 is fastened to the rotating shaft 169, and a cam roller 182 runs through the cam groove of the advancing-and-retracting cam 181 as the rotating shaft 169 rotates. As a result, both advancing-and-retracting plates 162 are caused to move along the slide rails 163 via an advancing-and-retracting cam lever and following lever, etc. (not shown; corresponding to the following cam lever 173 and following lever 178, etc.).

As a result of the rotation of the following cam 171 and advancing-and-retracting cam 181, the advancing-and-retracting plates 162 advance toward the rotating table 26. Accordingly, the attachment plates 153 are caused to advance by the tension springs 165, and at the same time, the intermediate plates 154 are caused to move in the tangential direction of the rotating table 26. Thus, the sealing rollers 148 are pressed against the sealing portions f of the spouts S held by the spout holding members 29 with a timing matched to the rotation of the spouts S, and the sealing rollers 148 perform a following motion. Bags W are fitted over the spouts S, and the sealing portions of the bags W and sealing portions of the spouts S are temporarily sealed during this following motion.

After this following motion has been continued for a specified distance, the advancing-and-retracting plates 162 are retracted. As a result, the attachment plates 153 are retracted so that the sealing rollers 148 are separated from the spouts S; and at the same time, the intermediate plates 154 and sealing rollers 148 return to their original positions. Subsequently, this operation is repeated.

Furthermore, in the example described above, sealing rollers 148 that are rotatable are used. However, it is possible to use sealing bodies that do not rotate.

Furthermore, in the above structure, the advancing-and-retracting mechanism of the attachment plates 153 is constructed from an advancing-and-retracting cam 181, advancing-and-retracting plates 162, cam roller 161 and tension springs 165, etc. Instead of this mechanism, it is also possible to attach, for instance, air cylinders to the intermediate plates 154, and to cause the sealing rollers 148 to advance and retract with a specified timing by the air cylinders. In this case, it is also possible to arrange the system so that the sealing rollers are retracted by the air cylinders in cases where there is an emergency stoppage of the rotating table 26 or improper insertion of the spouts (e.g., bags not fitted over specified positions on the spouts reaching the temporary-sealing position, etc.), thus temporarily releasing the seals or suspending the sealing operation.

Figure 15:
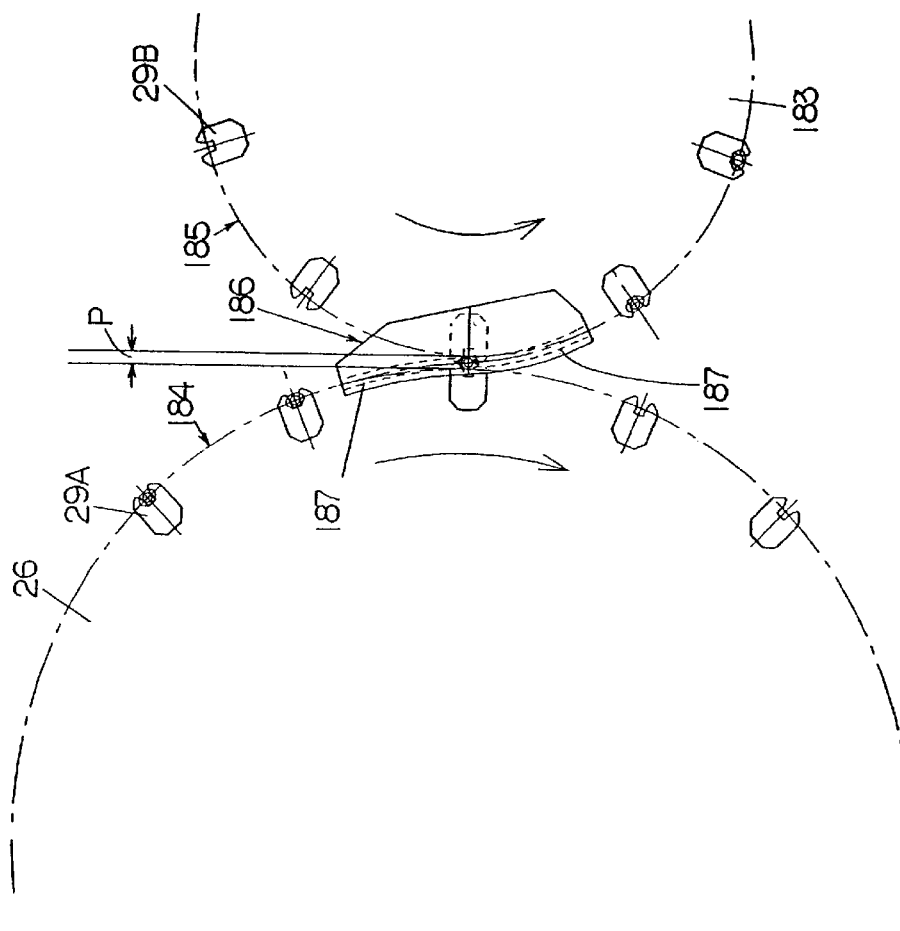
FIG. 15 is a top view of the guide member used for transfer.

The transfer of the bags with attached spouts will be described with reference to FIGS. 15 and 16. In FIGS. 15 and 16, bags with attached spouts are transferred from the spout holding members 29 (29A) disposed on the circumference of the rotating table 26 of the spout insertion and temporary-sealing apparatus 2 to the spout holding members 29 (29B) disposed on the circumference of the rotating table (rotor) 183 of the transfer apparatus 5.

The heights of the spout holding members 29A and 29B are varied so that one set of spout holding members (29A) clamp the upper-side groove between the flanges of the spouts S while the other set of spout holding members (29B) clamp the lower-side groove between the flanges of the spouts S. Furthermore, the conveying tracks 184 and 185 of the centers of the respective spout holding positions of the spout holding members 29A and spout holding members 29B are positioned so that the tracks do not meet, but rather have a small gap p between the two tracks. A guide member 186 which transfers the bags with attached spouts from the spout holding members 29A disposed on the upstream-side rotating table 26 to the spout holding members 29B disposed on the downstream-side rotating table 183 is disposed between the two rotating tables 26 and 183.

This guide member 186 is equipped with a groove 187 into which the head portions h of the spouts S are inserted. The groove 187 is formed with a continuous curve. The center of the groove is located on the upstream-side conveying track 184 at the entry point of the groove. The center of the groove gradually moves away from the conveying track 184 (i.e., approaches the downstream-side conveying track 185) as the groove approaches the transfer position (i.e., the position of closest proximity of the two conveying tracks 184 and 185). Also, the center of the groove passes through the intermediate position of the gap p at the transfer position, and the center of the groove then gradually approaches the downstream-side conveying track 185 so that the center of the groove is located on the conveying track 185 at the exit point of the groove.

Figure 16A:
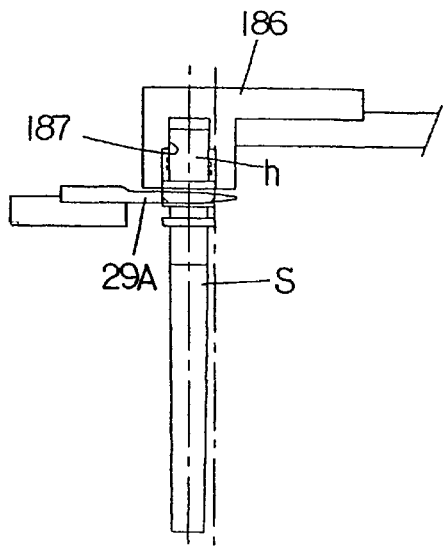
FIGS. 16A, 16B, and 16C is an explanatory diagram of the operation thereof.
Figure 16B:
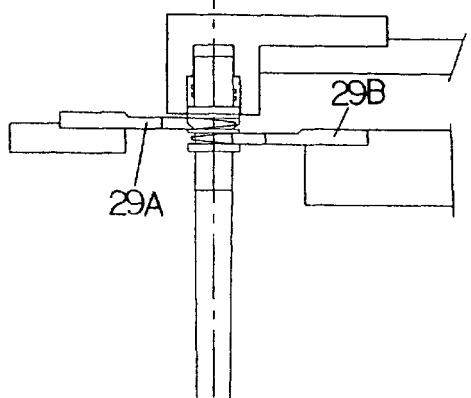
Figure 16C:
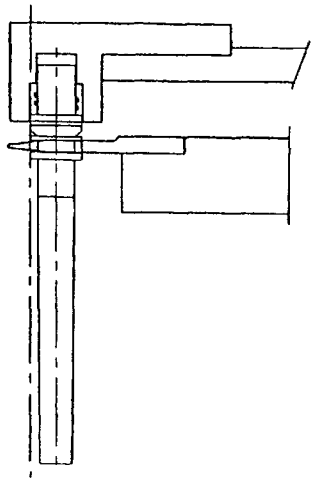

Accordingly, when spouts S held by the spout holding members 29A rotate and approach the guide member 186, the head portions of the spouts S enter the groove 187 (see FIG. 16A). The spouts S are guided by the groove 187 so that the spouts S are gradually pulled to the outside from the centers of the holding positions of the spout holding members 29A and are inserted into the spout holding members 29B via the entry points of the spout holding members 29B.

As the spouts S rotate further and reach the transfer position (see FIG. 16B), the spouts S are pulled to the vicinity of the entry points of the spout holding members 29A, and are pushed into the spout holding members 29B by a corresponding amount. Then, the spouts S are pulled completely out of the spout holding members 29A, and are pushed to the centers of the spout holding positions of the spout holding members 29B, so that transfer is completed (see FIG. 16C).

Furthermore, fan-shaped tapered surfaces that open outward are formed in the vicinity of the entry points of the spout holding members 29B and spout holding members 29A. Thus, the insertion of the spouts S into the spout holding members 29B and the pulling of the spouts S out of the spout holding members 29A can be accomplished without hindrance. Moreover, the spout holding members 29 (29A, 29B) are plate-form members whose thickness is approximately the same as the widths of the grooves d and e between the flanges of the spouts S, so that the spouts S can be accurately positioned and held. Furthermore, the thickness of the spout holding members is somewhat reduced moving toward the tip end portions in the vicinity of the entry points of the spout holding members, so that insertion into the grooves d and e is facilitated. Moreover, the width of the clamping grooves 29a (see FIG. 7) is set so that this width is more or less the same as the gaps between the left and right grooves d-d and e-e of the spouts S.

FIG. 17 shows a transfer apparatus 11 to which a defective product discharge device is attached. The transfer apparatus 11 comprises a supporting stand 188 which is disposed on the base 16, a rotating shaft 189, and a rotating table (rotor) 191. The rotating table (rotor) 191 rotates while attached to the upper end of the rotating shaft 189 and which has a plurality of spout holding members 29 disposed on its circumference. A defective product discharge device 193 is disposed on a bracket 192 which is attached to the supporting stand 188. This defective product discharge device 193 comprises a discharge plate 195 and an air cylinder 194 which causes this discharge plate 195 to advance and retract. This discharge plate 195 is ordinarily maintained in the retracted position (indicated by a solid line). The state of attachment of the spouts S with respect to the bags W is imaged by a CCD camera 196 (see FIG. 1), and in cases where there is a bag with an attached spout that has been judged to be a defective product by the control section, the air cylinder 194 is instantaneously operated on the basis of a control signal from the control section when this bag rotates to the forward position, so that the discharge plate 195 is caused to protrude into the forward contact position (indicated by the imaginary line). The discharge plate 195 contacts the spout S and pushes the spout S out of the spout holding member 29, so that the bag with the attached spout is discharged toward the outer circumference of the rotating table 191, and is discharged to the outside of the apparatus by a discharge conveyor, etc. The reference numeral 197 indicates an advancing-and-retracting guide rod of the discharge plate 195. Furthermore, the term "defective product" includes, for example, bags in which the spout is not completely welded to the bag, and bags in which the attachment position of the spout with respect to the bag is shifted, etc.

In the above spout sealing apparatus (FIG. 1), a plurality of spout holding members 29 are also similarly disposed on the circumferences of the rotating tables of the primary sealing apparatus 6, secondary sealing apparatus 8 and cold-sealing apparatus 10. The respective sealing means (primary sealing means, secondary sealing means and cold-sealing means) are disposed in positions located beneath the respective spout holding members 29. Accordingly, when the bags with attached spouts that have been temporarily sealed by the spout insertion and temporary-sealing apparatus 2 are successively conveyed to the respective sealing apparatuses 6, 8 and 10 via the respective transfer apparatuses 5, 7 and 9, the bags are held by the spout holding members 29 of the respective rotating tables, and the respective sealing treatments are performed in approximately three quarters of a revolution. Then, the bags are conveyed to the following processes via the next transfer apparatuses 7, 9 and 11.

Equal numbers (16 sets) of primary sealing means, secondary sealing means and cold-sealing means are respectively disposed in the respective sealing apparatuses 6, 8 and 10. Consecutive numbers 1 through 16 are respectively assigned to the primary sealing means, secondary sealing means and cold-sealing means, and the numbers are set so that the bag with attached spout that is sealed by the nth primary sealing means is treated by the nth secondary sealing means, and is further treated by the nth cold-sealing means. Furthermore, for example, when the state of spout attachment is inspected by means of the CCD camera 196 for bags with attached spouts sealed by the respective nth sealing means, the bags are counted with the same n number by the control device (i.e., all bags with attached spouts are always inspected with the numbers 1 through 16 assigned).

In cases where bags with attached spouts which are judged to be defective products appear, the numbers of the bags are displayed or stored by the control device. The numbers are also the numbers of the sealing means in which the defective bags with attached spouts have appeared; accordingly, assuming that the defect is caused by one of the sealing apparatuses, the abnormal sealing means can immediately be specified. In such a case, it is sufficient to inspect the respective sealing means of the three sealing apparatuses 6, 8 and 10 whose numbers have been displayed.

As seen from the above, the present invention increases the processing speed and improves the productivity in the manufacture of bags with attached spouts using a rotary apparatus.

What is claimed is:

1. A spout sealing method comprising the steps of:

holding spouts by means of a plurality of spout holding members tat are disposed on a circumference of a continuously rotating rotor of a spout insertion and temporary-sealing apparatus, fitting bags over said spouts while rotationally conveying said spouts, temporarily sealing sealing-portions of said bags and spouts by linear sealing or point sealing, continuously transferring said bags to which said spouts are attached and said temporary sealing has been applied from said spout insertion and temporary-sealing apparatus to a spout main-sealing apparatus, holding said spouts of said bags with attached spouts by means of a plurality of spout holding members disposed on a circumference of a continuously rotating rotor of said spout main-sealing apparatus, and performing a main sealing operation to said bags and spouts while rotationally conveying said bags with attached spouts.

2. The spout sealing method according to claim 1, wherein said main-sealing comprises a primary sealing and a secondary sealing which are performed after said temporary sealing and comprise the steps of:

continuously transferring said bags with attached spouts that have been subjected to said temporary sealing from said spout insertion and temporary-sealing apparatus to a primary sealing apparatus, holding spouts of said bags with attached spouts by means of a plurality of spout holding members disposed on a circumference of a continuously rotating rotor of said primary sealing apparatus, performing said primary sealing while rotationally conveying said bags with attached spouts, continuously transferring said bags with attached spouts from said primary sealing apparatus to a secondary sealing apparatus, holding spouts of said bags with attached spouts by means of a plurality of spout holding members disposed on a circumference of a continuously rotating rotor of said secondary sealing apparatus, and performing said secondary sealing to said bags and spouts while rotationally conveying said bags with attached spouts.

3. The spout sealing method according to claim 1, wherein a cold-sealing is performed after said main sealing byte steps of:
   continuously transferring said bags with attached spouts that have bean subjected to said main sealing from said main-sealing apparatus to a cold-sealing apparatus,
   holding said spouts of said bags wit attached spouts by means of a plurality of spout holding members disposed on a circumference of a continuously rotating rotor of said cold-sealing apparatus, and
   performing a cold sealing operation to said bags with attached spouts while rotationally conveying said bags with attached spouts.

4. The spout sealing method according to claim 1, wherein said spouts are formed on sealing portions thereof with one or more projecting strips oriented in a lateral direction, and said sealing portions and said bags are temporarily sealed with said projecting strips being prevented from said temporary sealing.

5. A spout sealing apparatus comprising:
   a spout insertion and temporary-sealing apparatus in which:
      a plurality of spout holding members that hold spouts are disposed on a circumference of a continuously rotating rotor,
      insertion means that fit bags over said spouts that are held by said spout holding members are disposed so as to correspond to said respective spout holding members, and
      a temporary-sealing apparatus is disposed near said rotor so as to temporarily seal said bags and said spouts held by said spout holding members;
   a spout main-sealing apparatus in which:
      a plurality of spout holding members tat hold spouts are disposed on a circumference of a continuously rotating rotor, and
      main-sealing means that perform a main sealing of said bags with attached spouts that are held by said spout holding members are disposed so as to correspond to respective said spout holding members, and
   a rotating transfer apparatus in which a plurality of spout holding members that hold spouts are disposed on a circumference of a continuously rotating rotor, and wherein
      said rotating transfer apparatus is disposed between said spout insertion and temporary-sealing apparatus and the spout main-sealing apparatus, so that said rotating transfer apparatus continuously transfers bags with attached spouts from said spout insertion and temporary-sealing apparatus to said spout main-sealing apparatus.

6. The spout sealing apparatus according to claim 5, wherein:
   said the spout main-sealing apparatus comprises a primary sealing apparatus and a secondary sealing apparatus, in both of which:
      a plurality of spout holding members that hold spouts are disposed on a circumference of a continuously rotating rotor, and
      main-sealing means that perform said main sealing of said bags with attached spouts held by said spout holding members arc disposed so as to correspond to said respective spout holding members; and
   a rotating transfer apparatus in which a plurality of spout holding members that hold spouts are disposed on a circumference of a constantly rotating rotor is disposed between said primary sealing apparatus and secondary sealing apparatus, so that said rotating transfer apparatus continuously transfers bags with attached spouts from said primary sealing apparatus to said secondary sealing.

7. The spout sealing apparatus according to claim 5, wherein:
   a spout cold-sealing apparatus is disposed on a downstream side of said spout main-sealing apparatus, and in spout cold-sealing apparatus:
      a plurality of spout holding members that hold spouts are disposed on a circumference of a continuously rotating rotor, and
      cold-sealing means that cold-seal said bags with attached spouts that arc held by said spout holding members are disposed so as to correspond to respective said spout holding members, and
   a rotating transfer apparatus in which a plurality of spout holding members that hold spouts are disposed on a circumference of a continuously rotating rotor is disposed between said spout main-sealing apparatus and said spout cold-sealing apparatus, so that said rotating transfer apparatus continuously transfers bags with attached spouts from said spout main-sealing apparatus to said spout cold-sealing apparatus.

8. The spout sealing apparatus according to claim 7, further comprising a rotating transfer apparatus in which a plurality of spout holding members that hold spouts are disposed on a circumference of a continuously rotating rotor, said rotating transfer apparatus being disposed on a downstream side of said spout cold-sealing apparatus, so that said rotating transfer apparatus transfers bags with attached spouts from said spout cold-sealing apparatus to an apparatus of next process.

9. The spout sealing apparatus according to claim 5, wherein:
   said spout holding members are fork-shaped members which have clamping grooves that are oriented outward in a radial direction so as to hold groove portions located between flanges of said spouts, and
   a defective bag discharge device is provided for said rotating transfer apparatus, said defective bag discharge device is comprised of:
      a discharge member which contacts spouts of defective bags held by said spout holding members and pushes said spouts outward in a radial direction, and
      an advancing-and-retracting mechanism which advances and retracts said discharge member between a retracted position and a contact position.

10. The spout sealing apparatus according to any one of claims 5 through 9, wherein:
    said temporary-sealing apparatus is equipped with
       a heated rotating sealing body which is disposed in close proximity to an outer circumferential side of a rotor and rotates at a urine speed as spouts held by said spout holding members, and
       advancing-and-retracting back-up members which advance and retract in a radial direction and are installed on an inner circumferential side of a rotor so as to correspond to respective said spout holding members, and wherein
          said rotating sealing body contacts sealing portions of said spouts with bags fitted thereon, and said buck-up members advance outward in a radial direction upon arrival at a temporary sealing position and contact insides of said sealing portions of said spouts with said bags fitted thereon, thus supporting said bags from said insides.

11. The spout sealing apparatus according to any one of claims 5 through 8, wherein:

said spout holding members are fork-shaped members which have clamping grooves that are oriented outward in a radial direction so as to hold groove portions located between flanges of said spouts, and tapered surfaces that open outward are formed in a vicinity of an entry point of said clamping groove.

12. The spout sealing apparatus according to claim 11, wherein:

a guide member which transfers said bags with attached spouts from spout holding members disposed on a rotor located on an upstream side to spout holding members disposed on a rotor located on a downstream side is disposed between adjacent rotors, said guide member is provided with a downward-facing groove which is continuously curved from a conveying track of centers of spout holding positions of spout holding members disposed on a rotor located on an upstream side to a conveying track of centers of said spout holding positions of spout holding members disposed on a rotor located on a downstream side, and said guide member inserts head portions of said spouts into said groove and guides along said groove.

13. The spout sealing apparatus according to any one of claims 5 through 9 wherein:

said temporary-sealing apparatus is equipped with a heated sealing body which is disposed in close proximity to an outer circumferential side of a rotor and follows for a specified distance a rotation of said spouts held by spout holding members, and said sealing body repeatedly advances and contacts said sealing portions of said spouts with said bags fitted thereon that are held by said spout holding members, follows a rotation of said bags for a specified distance, and then withdraws and returns to its original position.

14. The spout sealing apparatus according to claim 11, wherein:

said temporary-sealing apparatus is equipped with a heated rotating sealing body which is disposed in close proximity to an outer circumferential side of a rotor and rotates at a same speed as spouts held by said spout holding members, and advancing-and-retracting back-up members which advance and retract in a radial direction and are installed on an inner circumferential side of a rotor so as to correspond to respective said spout holding members, and wherein said rotating sealing body contacts sealing portions of said spouts with bags fitted thereon, and said back-up members advance outward in a radial direction upon arrival at a temporary sealing position and contact insides of said sealing portions of said spouts with said bags fitted thereon, thus supporting said bags from said insides.

15. The spout sealing apparatus according to claim 12, wherein:

said temporary-sealing apparatus is equipped with a heated rotating sealing body which is disposed in close proximity to an outer circumferential side of a rotor and rotates at a same speed as spouts held by said spout holding members, and advancing-and-retracting back-up members which advance and refract in a radial direction and are installed on an inner circumferential side of a rotor so as to correspond to respective said spout holding members, and wherein said rotating sealing body contacts sealing portions of said spouts with bags fitted thereon, and said back-up members advance outward in a radial direction upon arrival at a temporary sealing position and contact insides of said sealing portions of said spouts with said bags fitted thereon, thus supporting said bags from said insides.

16. The spout sealing apparatus according to claim 11, wherein:

said temporary-sealing apparatus is equipped with a heated sealing body which is disposed in close proximity to an outer circumferential side of a rotor and follows for a specified distance a rotation of said spouts held by spout holding members, and said sealing body repeatedly advances and contacts said sealing portions of said spouts with said bags fitted thereon that are held by said spout holding members, follows a rotation of said bags for a specified distance, and ten withdraws and returns to its original position.

17. The spout sealing apparatus according to claim 8, wherein:

said temporary-sealing apparatus is equipped with a heated sealing body which is disposed in close proximity to an outer circumferential side of a rotor and follows for a specified distance a rotation of said spouts held by spout holding member, and said sealing body repeatedly advances and contacts said sealing portions of said spouts with said bags fitted thereon that are held by said spout holding members, follows a rotation of said bags for a specified distance, and then withdraws and returns to its original position.

* * * * *